United States Patent [19]

Mergenthaler et al.

[11] Patent Number: 5,194,722

[45] Date of Patent: Mar. 16, 1993

[54] ENHANCED UPC BAR CODE DECODING SYSTEM RECONSTRUCTING COMPLETE BAR CODE SIGNALS FROM PARTIAL BAR CODE SCANS

[75] Inventors: Barry M. Mergenthaler, Cambridge, Ohio; Marion Tapu, West Lebanon, N.H.; Denis M. Blanford; Gene L. Amacher, both of Cambridge, Ohio

[73] Assignee: NCR Corporation, Dayton, Ohio

[21] Appl. No.: 919,701

[22] Filed: Jul. 24, 1992

Related U.S. Application Data

[63] Continuation of Ser. No. 517,910, May 2, 1990, abandoned.

[51] Int. Cl.[5] ............................ G06K 7/10; G06K 7/01
[52] U.S. Cl. .................................. 235/463; 235/456; 235/470
[58] Field of Search ............... 235/456, 462, 463, 470, 235/472

[56] References Cited

U.S. PATENT DOCUMENTS

| | | | |
|---|---|---|---|
| 4,020,357 | 4/1977 | Punis | 250/568 |
| 4,282,426 | 8/1981 | Neseem et al. | 235/463 |
| 4,289,957 | 9/1981 | Neyroud et al. | 235/462 |
| 4,329,574 | 5/1982 | Jordan Jr. | 235/463 |
| 4,409,469 | 10/1983 | Yasuda et al. | 235/463 |
| 4,528,443 | 7/1985 | Smith | 235/462 |
| 4,567,360 | 1/1986 | Yamada | 235/455 |
| 4,575,625 | 3/1986 | Knowles | 235/467 |
| 4,667,089 | 5/1987 | Schirakabe et al. | 235/462 |
| 4,717,781 | 1/1988 | Broockman et al. | 235/462 |
| 4,973,829 | 11/1990 | Ishida et al. | 235/462 |
| 5,045,677 | 9/1991 | Okamura | 235/462 |
| 5,124,538 | 6/1992 | Lapinski et al. | 235/467 |

*Primary Examiner*—Eugene R. LaRoche
*Assistant Examiner*—Christopher R. Glembocki
*Attorney, Agent, or Firm*—Paul W. Martin; Richard W. Lavin

[57] ABSTRACT

There is disclosed a system for decoding data read from a bar code label which includes a filter for detecting the occurrence of a character in the data generated by an optical scanner in reading the bar code label, a first processor for detecting whether the character is valid or a suspect character which may be a valid or a non-valid character and a second processor means for processing the suspect characters to determine if they are valid for use in detecting the numerical characters in the data.

20 Claims, 17 Drawing Sheets

| DECIMAL NUMBER | LEFT SIDE (ODD PARITY) | RIGHT SIDE (EVEN PARITY) |
|---|---|---|
| 0 | 0 0 0 1 1 0 1 | 1 1 1 0 0 1 0 |
| 1 | 0 0 1 1 0 0 1 | 1 1 0 0 1 1 0 |
| 2 | 0 0 1 0 0 1 1 | 1 1 0 1 1 0 0 |
| 3 | 0 1 1 1 1 0 1 | 1 0 0 0 0 1 0 |
| 4 | 0 1 0 0 0 1 1 | 1 0 1 1 1 0 0 |
| 5 | 0 1 1 0 0 0 1 | 1 0 0 1 1 1 0 |
| 6 | 0 1 0 1 1 1 1 | 1 0 1 0 0 0 0 |
| 7 | 0 1 1 1 0 1 1 | 1 0 0 0 1 0 0 |
| 8 | 0 1 1 0 1 1 1 | 1 0 0 1 0 0 0 |
| 9 | 0 0 0 1 0 1 1 | 1 1 1 0 1 0 0 |

1 : BLACK     0 : WHITE

UNRESOLVE BUFFER

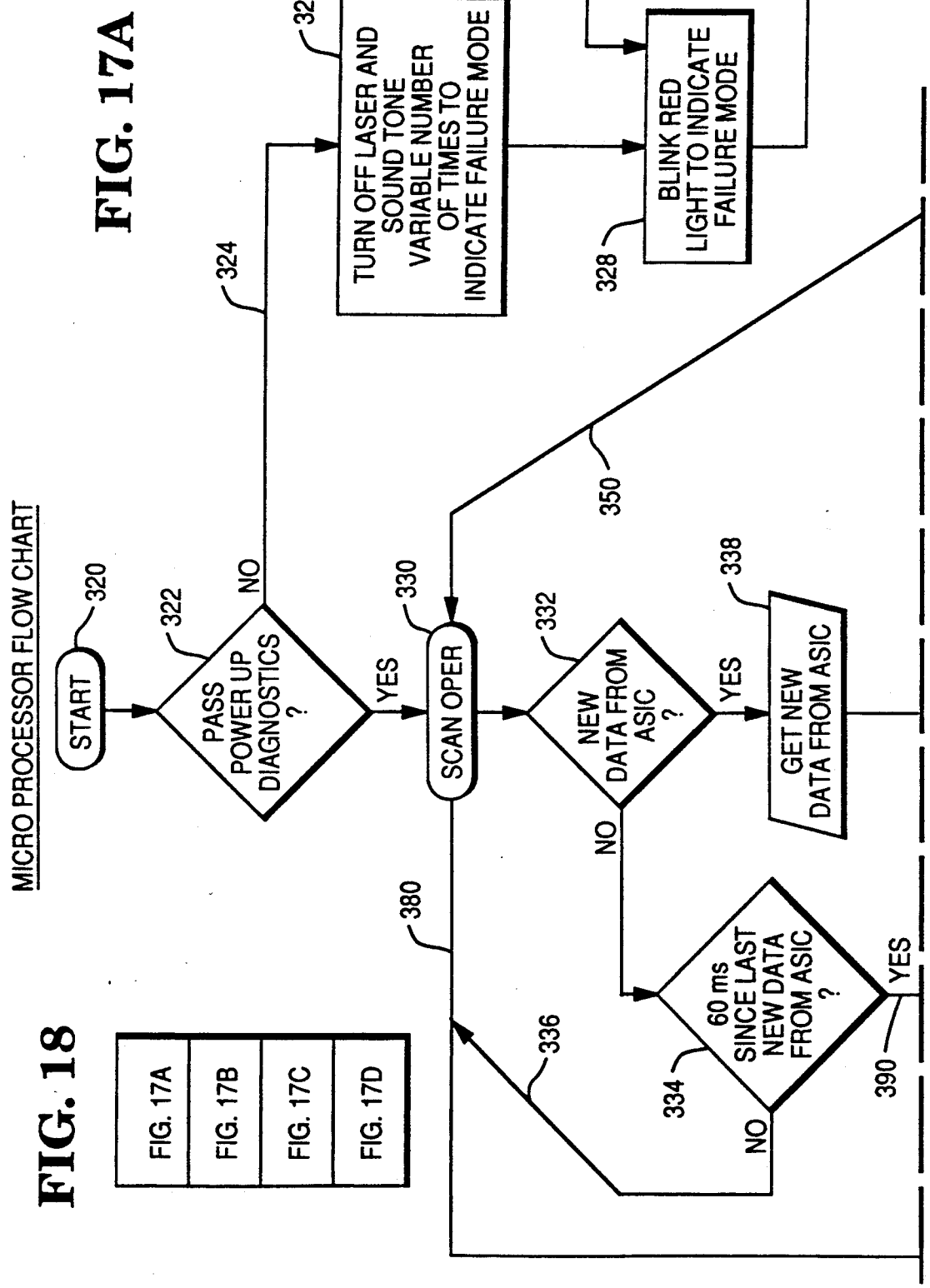

ENHANCED UPC BAR CODE DECODING SYSTEM RECONSTRUCTING COMPLETE BAR CODE SIGNALS FROM PARTIAL BAR CODE SCANS

This is a continuation of co-pending application Ser. No. 07/517,910 filed on May 2, 1990, now abandoned.

CROSS-REFERENCE TO RELATED APPLICATIONS

Reference is hereby made to the following copending patent application, filed on even date herewith and assigned to the NCR Corporation: Enhanced Bar Code Decoding Method, U.S. Ser. No. 917,730, invented by Denis Blanford.

BACKGROUND OF THE INVENTION

The present invention relates to a system for decoding a high density multiple bar code from a record medium at a high rate of speed and more particularly, relates to a bar code decoding system which includes a NMOS/LSI chip for increasing the rate of obtaining valid read operations used in decoding a UPC bar code label.

The use of bar coded symbols or labels intended to be read by optical scanning equipment as a means for identifying new data useful in processing items sold in a retail industry has been widely accepted to the point that a particular bar code known as the Universal Product Code (UPC) has been established as the industry standard for the grocery and other related retail industries. In a multiple bar code, such as the UPC, each decimal number or numerical character is represented by two pairs of vertical bars and spaces within a 7-bit pattern wherein a binary 1 bit represents a dark module or bar of a predetermined width and the binary 0 bit represents a light module or a space. Thus, the decimal or character 1 may be represented in the UPC code by the 7-bit pattern 0011001. In keeping with the format, the decimal 1 would be comprised of an initial space of a 2-bit width, followed by 2-bit wide bar, another 2-bit space and a 1-bit wide bar. For each character or decimal of the system there are two bars and two spaces which have a total width of 7 modules or bits. The width of each of the bars or spaces which comprise a character may be 1, 2, 3 or 4 modules wide as long as the sum of the bars and spaces is seven bits or modules wide.

A multiple bar code, such as the UPC, is normally read by an optical scanner which may take the form of a hand-held wand or a scanner mechanism located in a checkout counter. The optical scanner will scan the bar code pattern and generate signals representing the bars and spaces for transmission to the processing apparatus which determines the character represented by the bar code pattern.

Prior optical readers generally store the electrical signals generated as a result of scanning the bar code pattern until the accumulated signals stored are sufficient to allow the processing apparatus to initiate a recognition operation to determine the character represented by the scanned bar code pattern. Because of the speed in which the scanning operation is performed, the scanning operation has to be repeated until the accumulated signals represents a full bar code label. A typical scanning operation will generate signals representing a portion of the bar code label which, in prior optical readers, were ignored until the scanning operation produced signals representing at least one-half of the bar code label. It therefore took several scanning operations to read a bar code label, which delayed the completion of the checkout operation. Prior optical reader decoding systems were hardwired in their construction and were therefore unable to change the decoding system where different types of coded labels were to be read. With the availability of faster processors, prior bar code readers were unable to process the amount of data that was being generated which limited the speed of the checkout operation.

SUMMARY OF THE INVENTION

There is disclosed a system for decoding data read from a coded label which consists of a plurality of bars and spaces representing numeric characters and including a center band delimiting character and a margin delimiting character for delimiting the numerical characters in which data is generated which does not include both delimiting characters, the system including filter means for applying first predetermined relationships to said data for detecting the presence of numerical characters, first processing means for applying second predetermined relationships to said data for detecting valid numerical characters or suspect numerical characters which may be a valid or non-valid numerical character, first storage means for storing valid numerical characters, second storage means for storing suspect numerical characters and a second processing means for applying third predetermined relationships to the suspect numerical characters for detecting valid numerical characters.

It is therefore a principal object of this invention to provide a bar code decoding system which provides a high rate of valid read operations.

It is another object of this invention to provide an improved system for decoding bar code labels which reads the bar code label utilizing data scanned from partial portions of the coded label to arrive at a reading of the full label.

BRIEF DESCRIPTION OF THE DRAWINGS

These and other objects, features and advantages of the invention, as well as the invention itself, will become more apparent to those skilled in the art in light of the following detailed description, taking into consideration with the accompanied drawings, wherein like reference numerals indicate like or corresponding parts throughout the several views and wherein.

Figure 8:
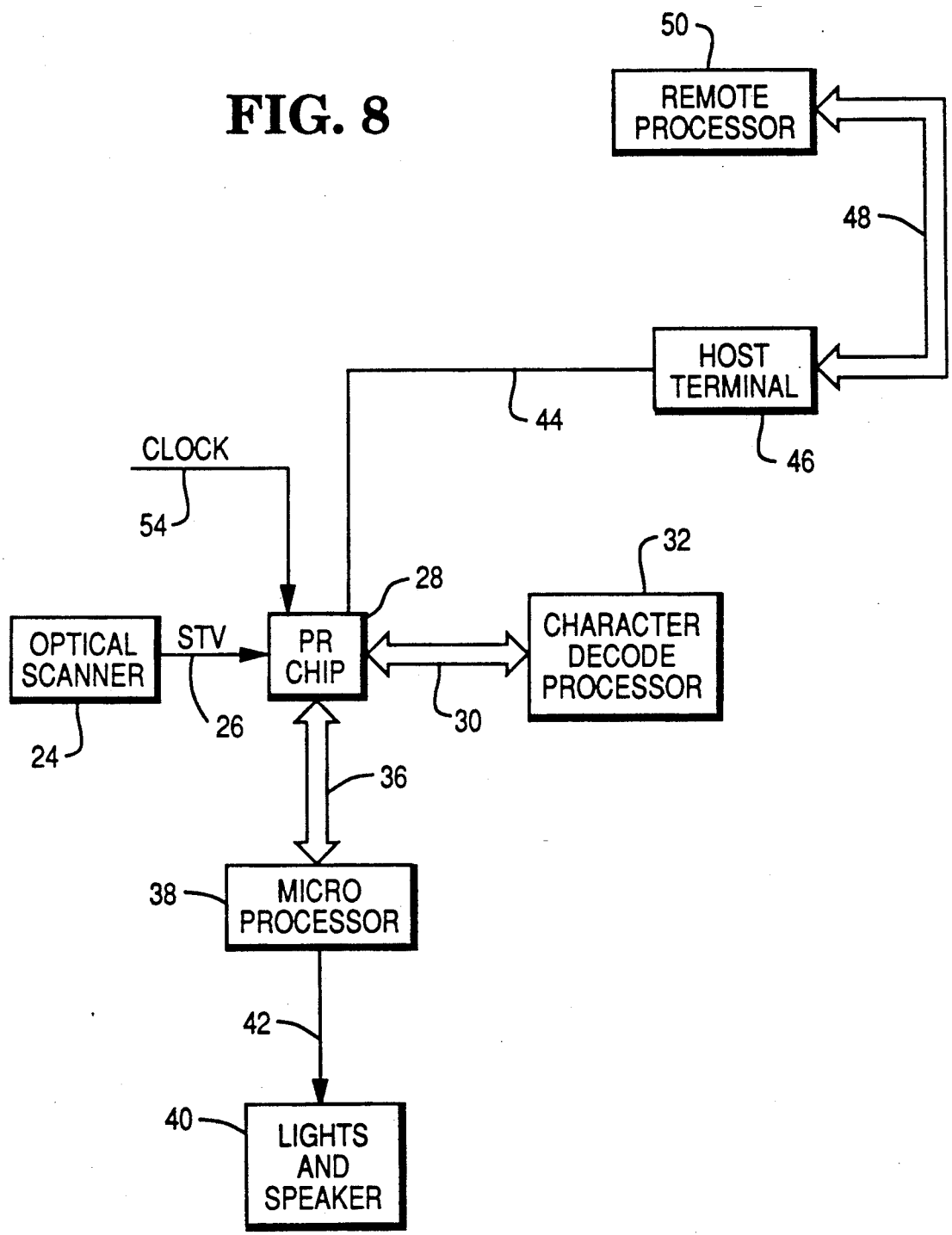
Figure 9:
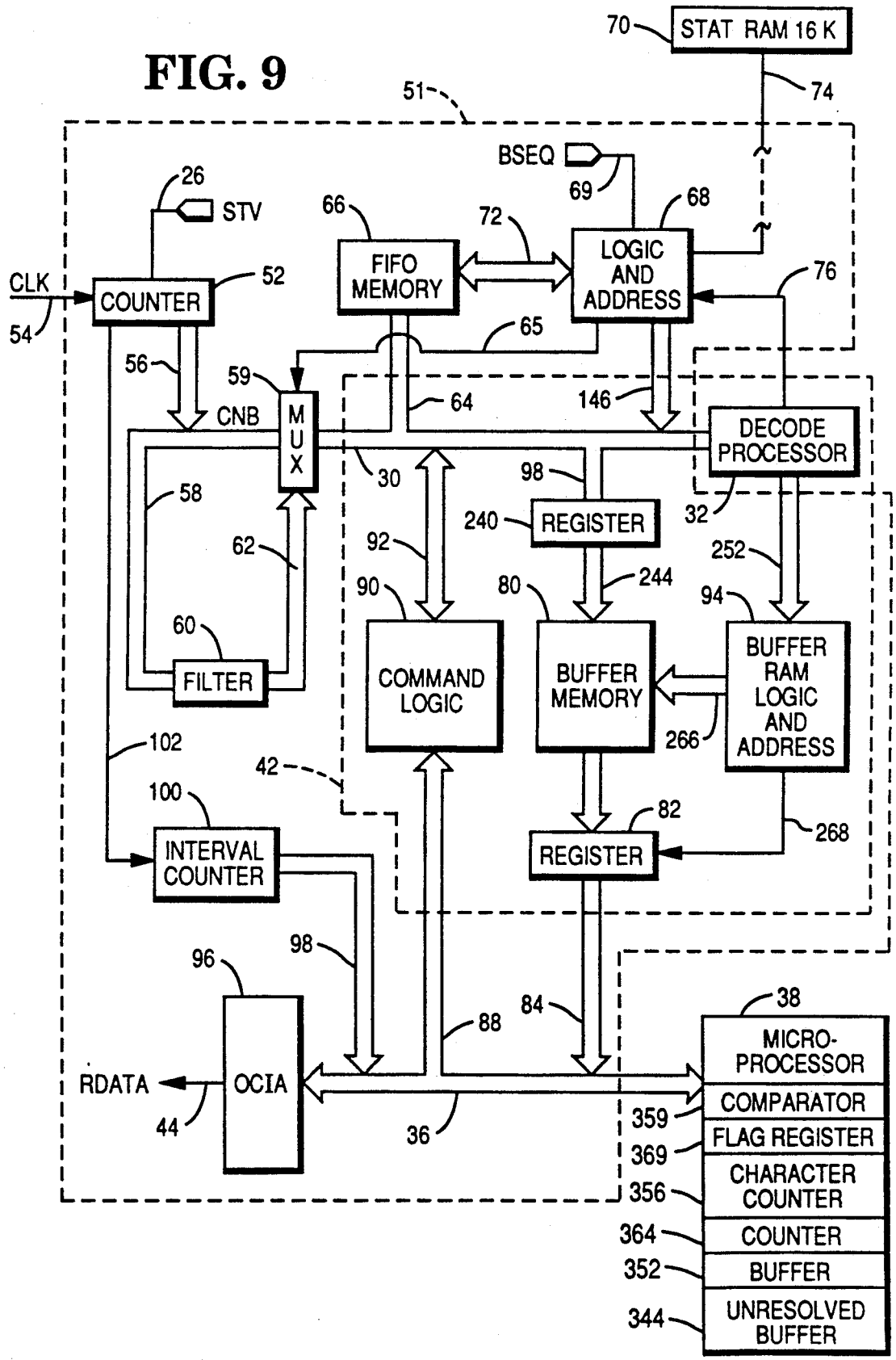
Figure 10:
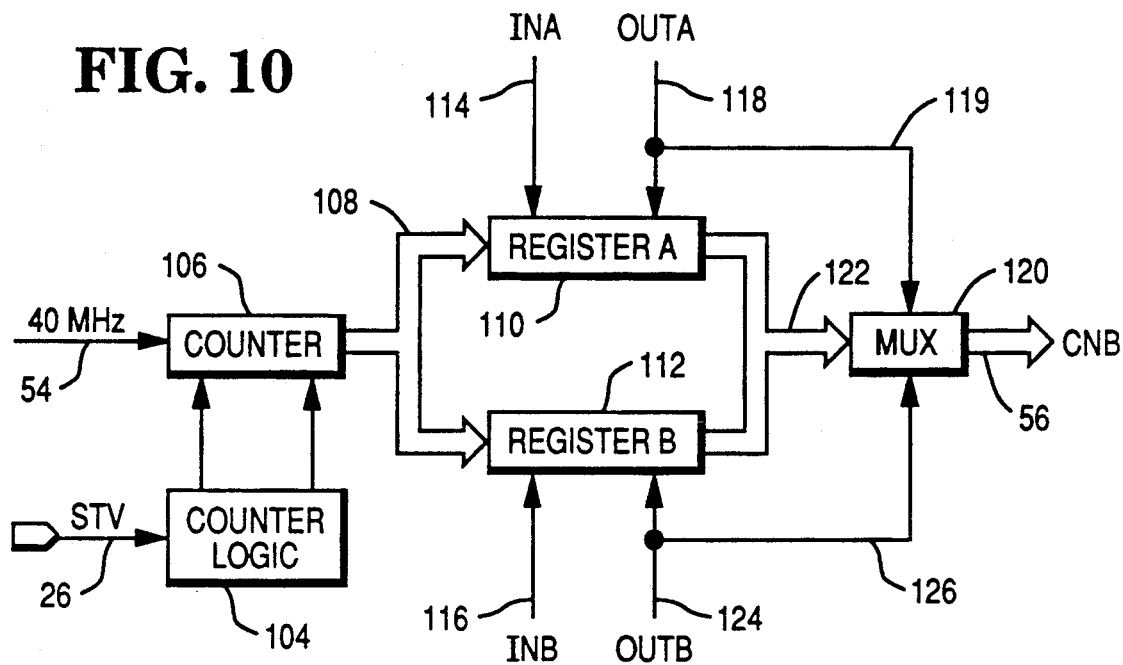
Figure 11:
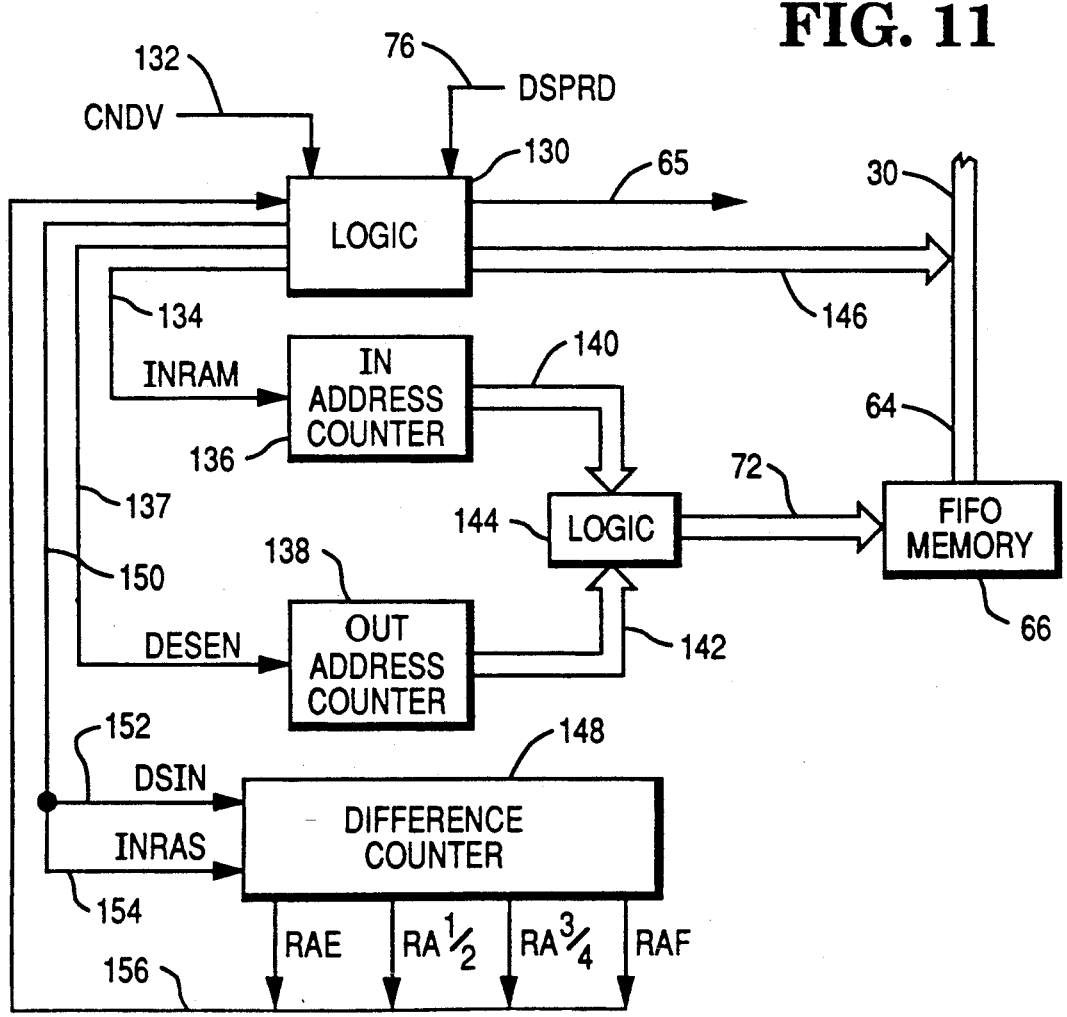
Figure 12:
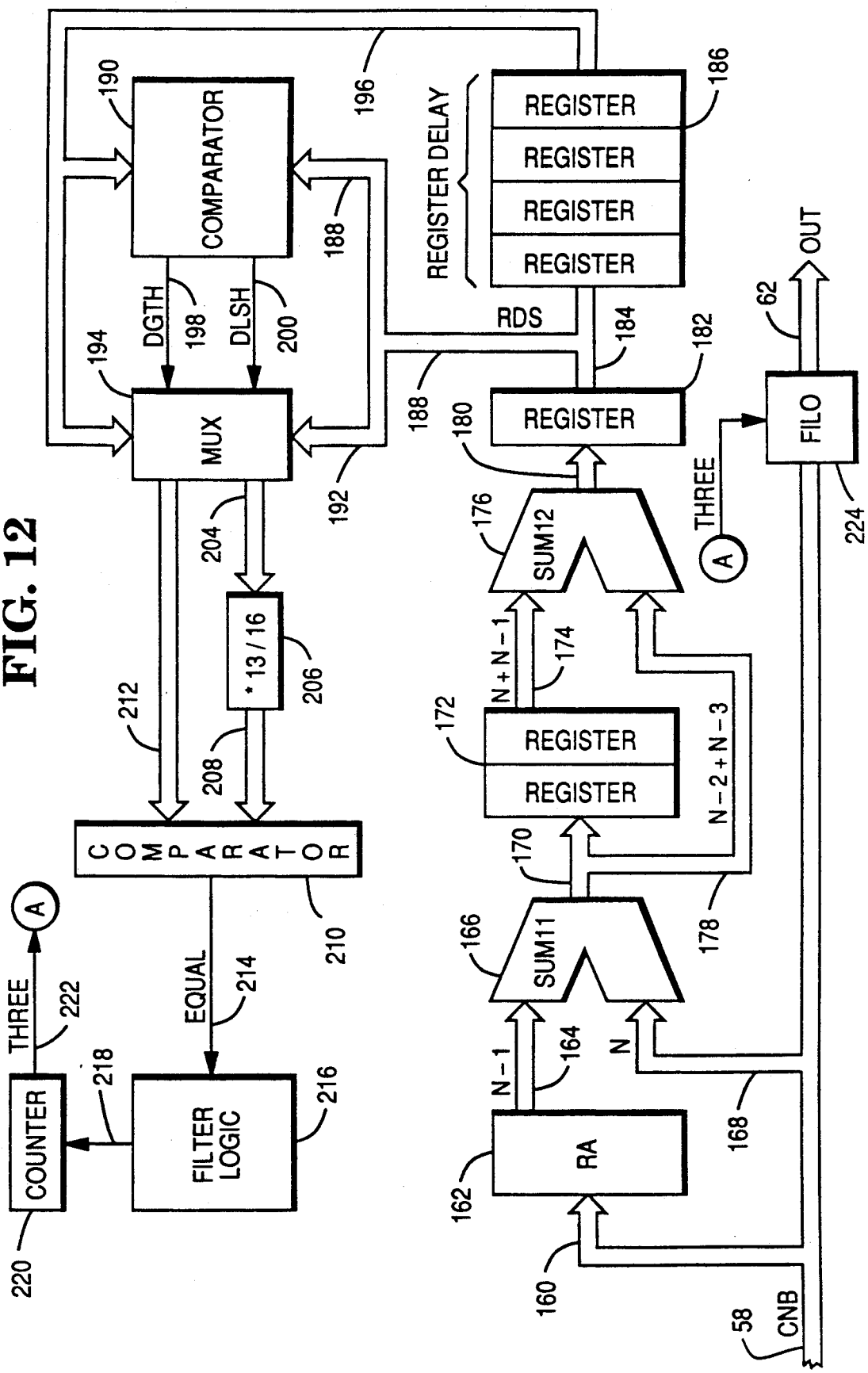
Figure 13:
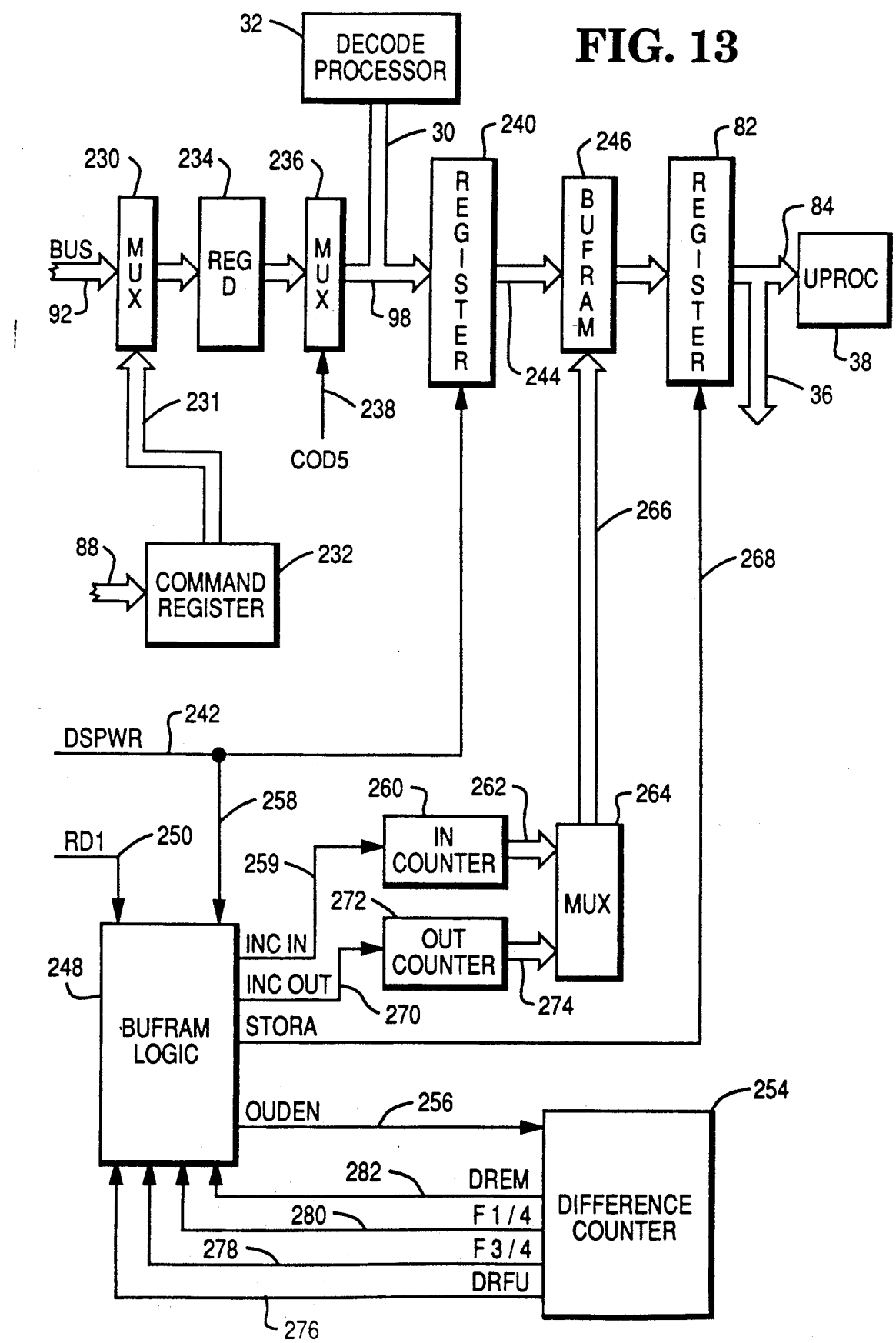
Figure 14:
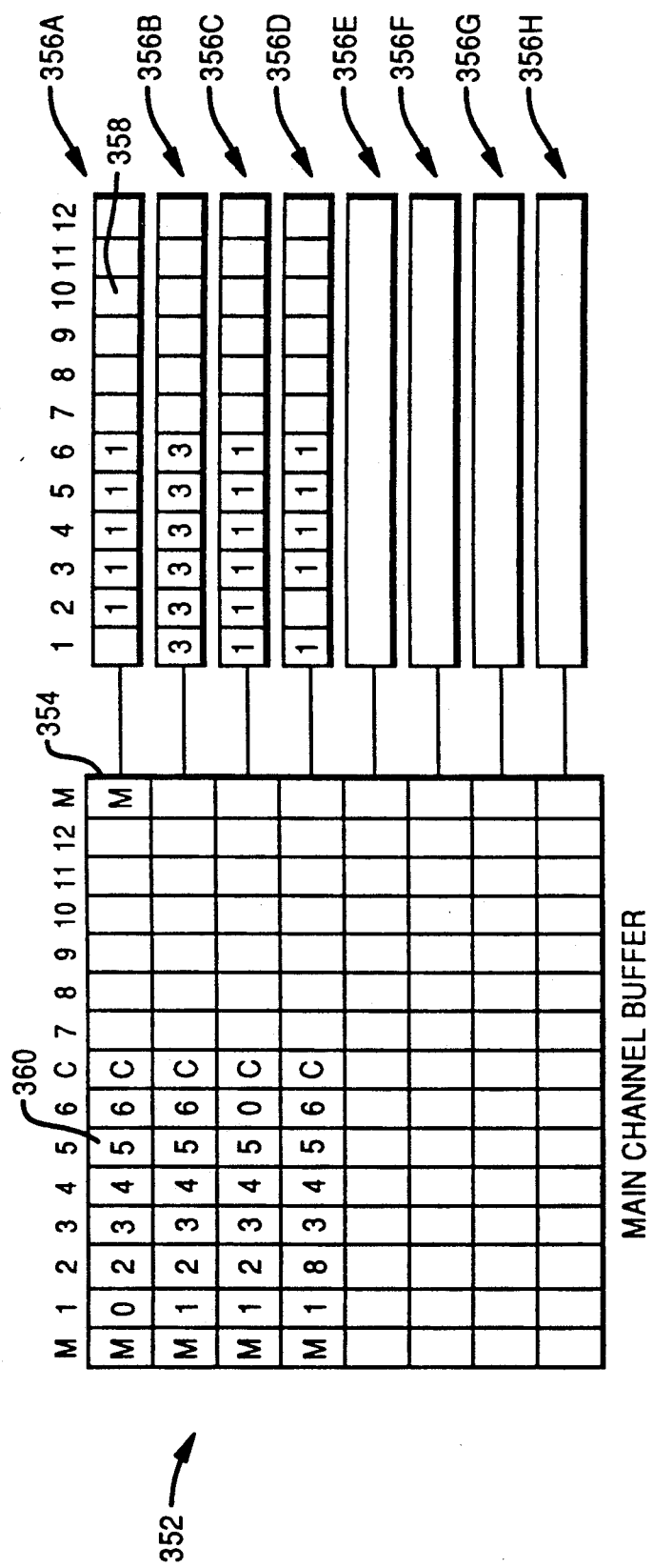
Figure 15:
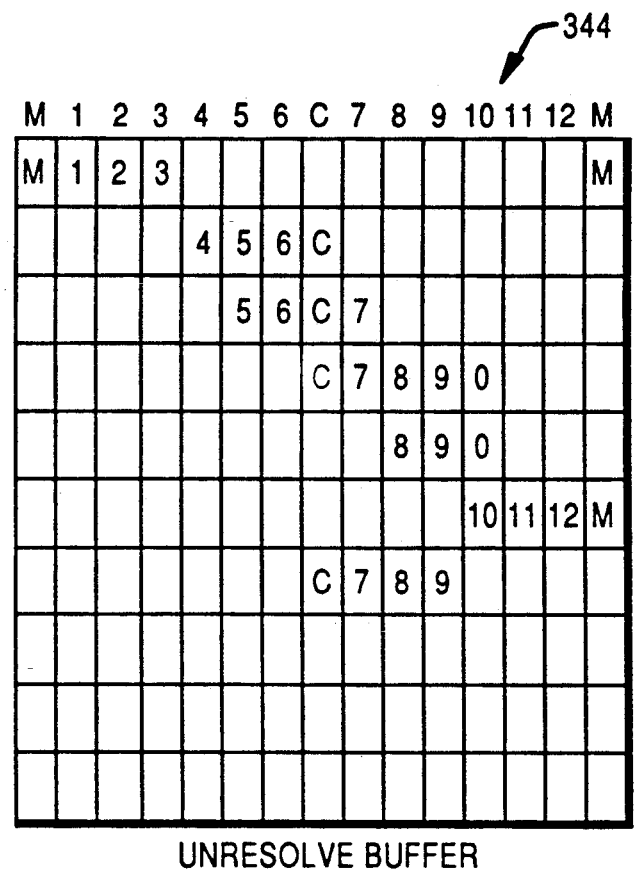
Figure 16A:
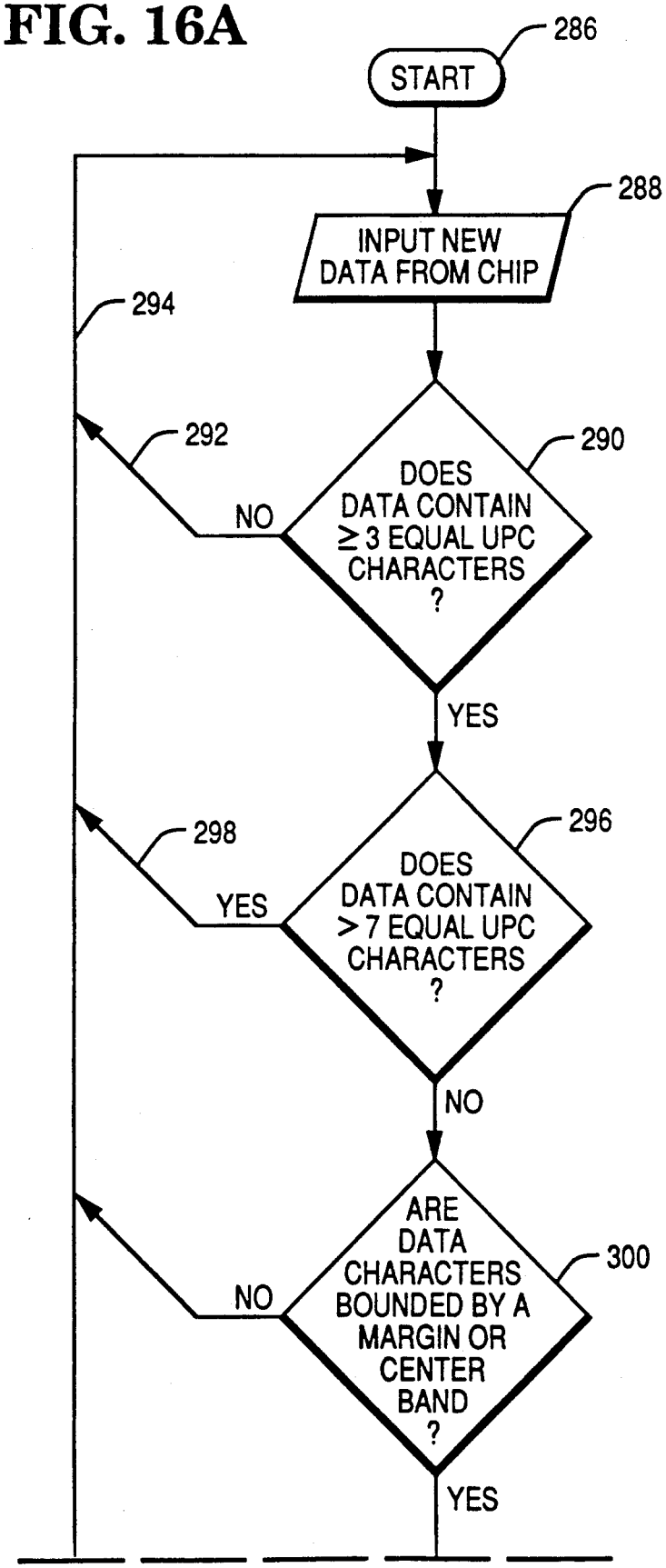
Figure 16B:
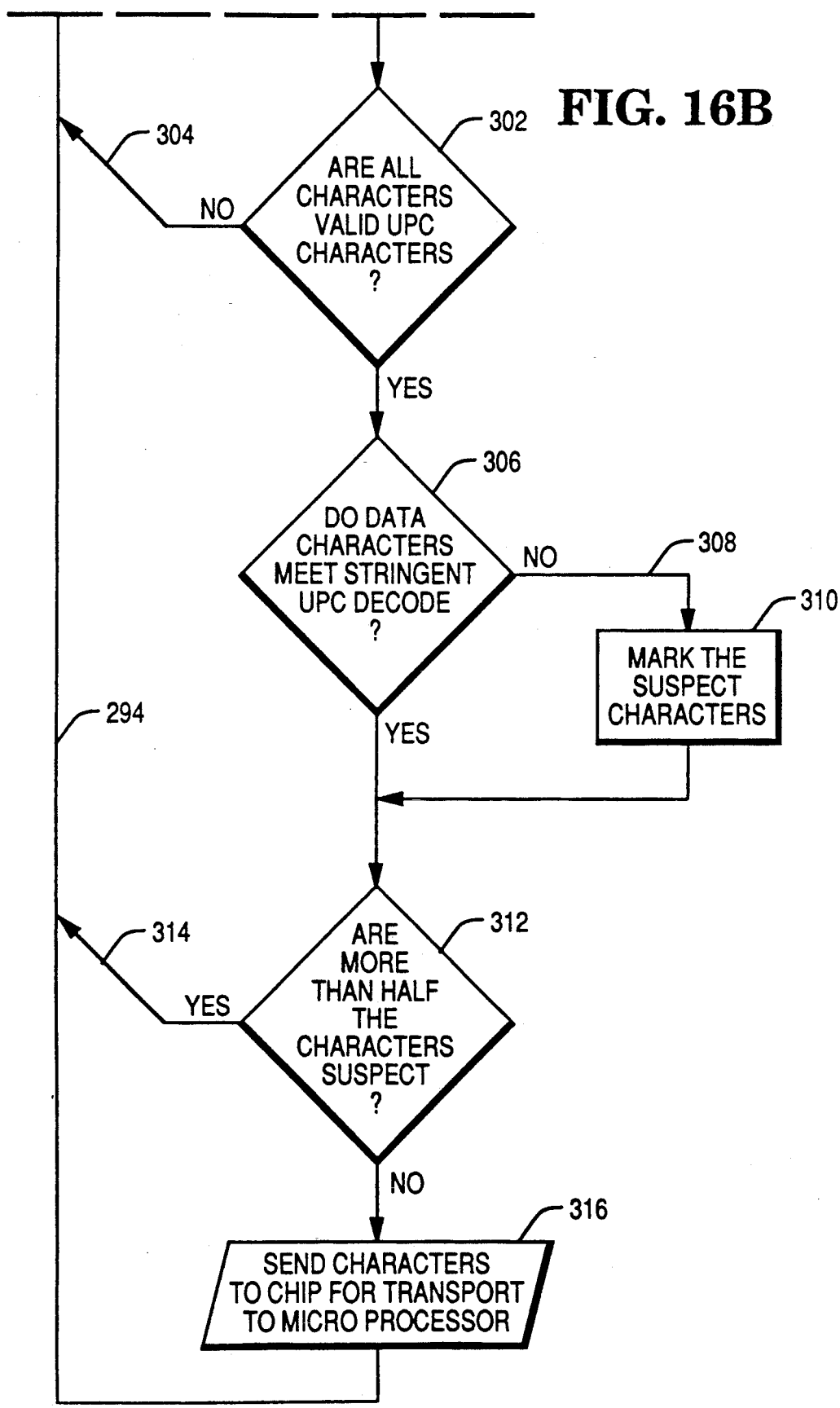

FIG. 8 is a block diagram of the bar code decoding system of the present invention;

FIG. 9 is a detailed block diagram of the pattern and recognition chip together with the character decode processor and the microprocessor which are part of the bar code decoding system of the present invention;

FIG. 10 is a block diagram of the frame capture buffer circuit of the pattern and recognition chip of FIG. 9 for capturing an interval of the bar code label;

FIG. 11 is a block diagram of a portion of the logic and address unit which is a part of the pattern and recognition chip of FIG. 9;

FIG. 12 is a block diagram of the pattern recognition filter of the pattern and recognition chip of FIG. 9;

FIG. 13 is a block diagram of the control circuits associated with the character decode processor and the microprocessor of the bar code decoding system of FIG. 8;

FIG. 14 is a graphical representation of the main character buffer of the microprocessor of the bar code decoding system of FIG. 8;

FIG. 15 is a graphical representation of the unresolved buffer of the microprocessor;

FIGS. 16A and 16B are a flow chart of the operation of the character decode processor for decoding the character from the interval data outputted by the pattern and recognition chip of FIG. 9.

Figure 19:
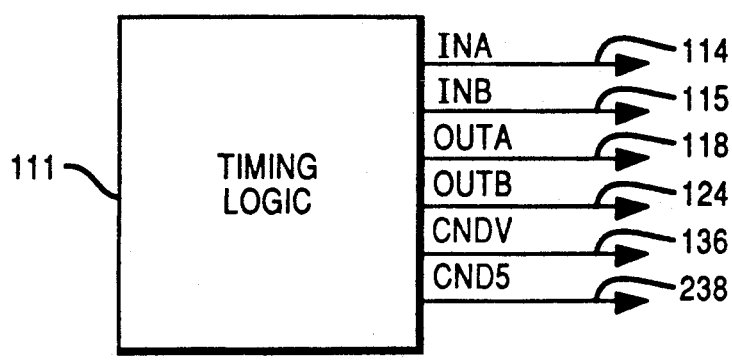

FIGS. 17A–17D inclusive are a flow chart of the general overall operation of microprocessor in decoding the data read from the bar code label in accordance with the present invention;

FIG. 18 is a diagram showing the manner in which FIGS. 17A–17D inclusive are arranged with respect to each other to form the flow chart of the overall recognition operations; and FIG. 19 is a diagram showing the control signals outputted from a timing logic unit of the pattern and recognition chip.

DESCRIPTION OF THE PREFERRED EMBODIMENT

Figure 1:
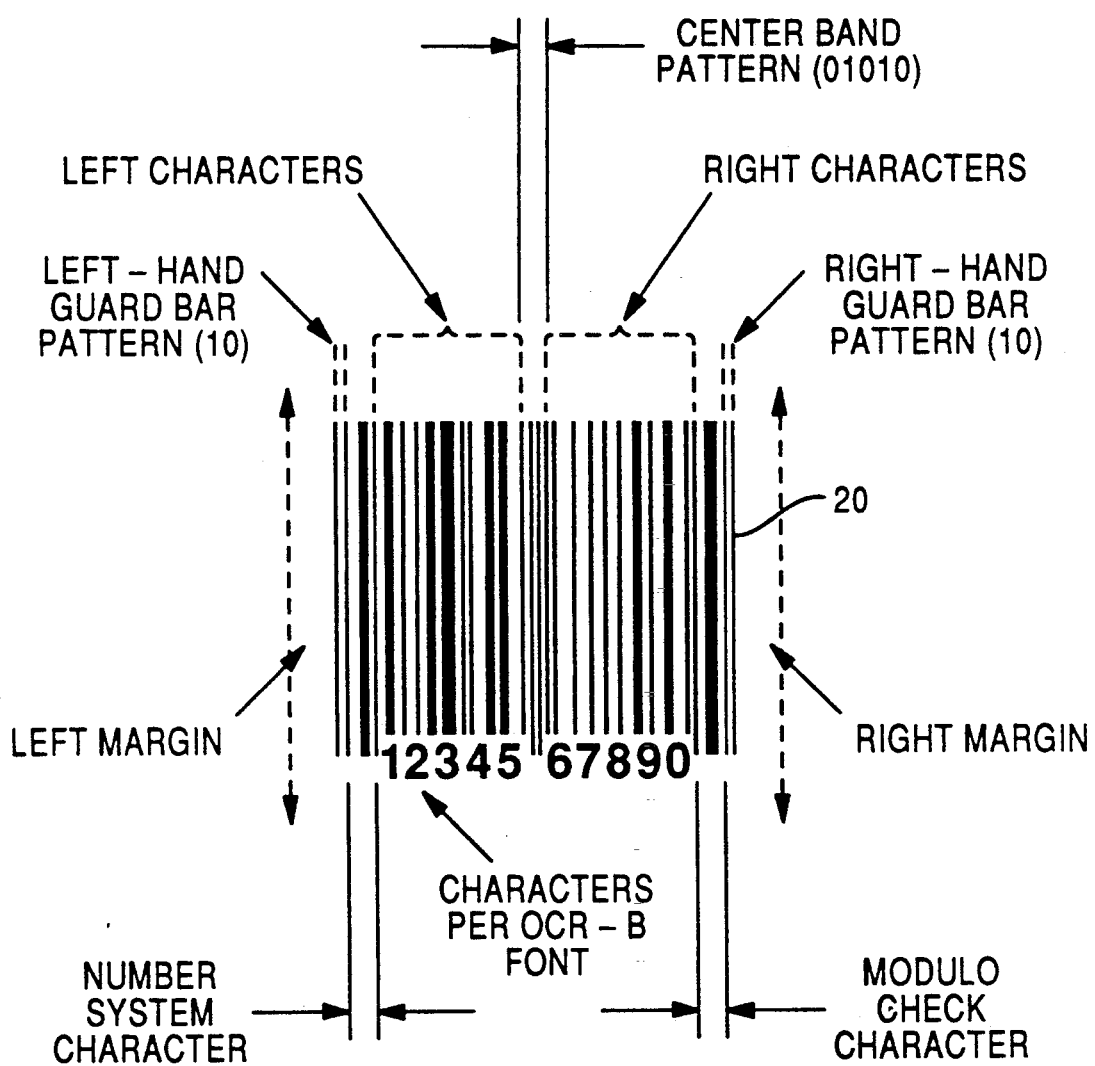
FIG. 1 is a graphical representation of a symbol or a coded label such as a UPC coded symbol.

Referring now to FIG. 1, there is shown a graphical representation of a UPC symbol or coded label 20. The UPC symbol 20 is made up of a series of light and dark parallel bars which comprise twelve characters. Among the twelve characters, two characters are of the industry code and modulo check characters and the remaining ten characters are of the main code representing numerical data associated with a merchandise item. Normally this data represents the identity of the item which is used to obtain the price of the item. As shown in FIG. 1, included in the label is a readable number printed in OCR-B font. In addition to the series of light and dark parallel bars, the UPC symbol includes spaces on both sides which are referred to as the left and right margins. Other characteristics of the UPC symbol include the following:

(1) The overall shape of the symbol is a rectangle;

(2) Each character of a UPC code is represented by two dark bars and two light spaces;

(3) Each character is comprised of seven equal data elements called modules;

(4) Each module can be light or dark;

(5) Each bar may be composed of 1, 2, 3 or 4 dark modules. Light spaces may also be composed of 1, 2, 3 or 4 modules;

(6) Each character is independent;

(7) The right-most character of the symbol is a modulo check character while the left-most character of the symbol indicates a system in which this symbol is encoded;

(8) The size of the UPC symbol is variable, that is, it may be large or small without affecting its readability. The UPC symbol may consist of only six characters having the same arrangement as shown in FIG. 1;

(9) The series of light and dark parallel bars are separated from the margins on each side by left and right guard bar patterns and include a center band pattern located at the center of the UPC symbol.

Figures 2, 3:
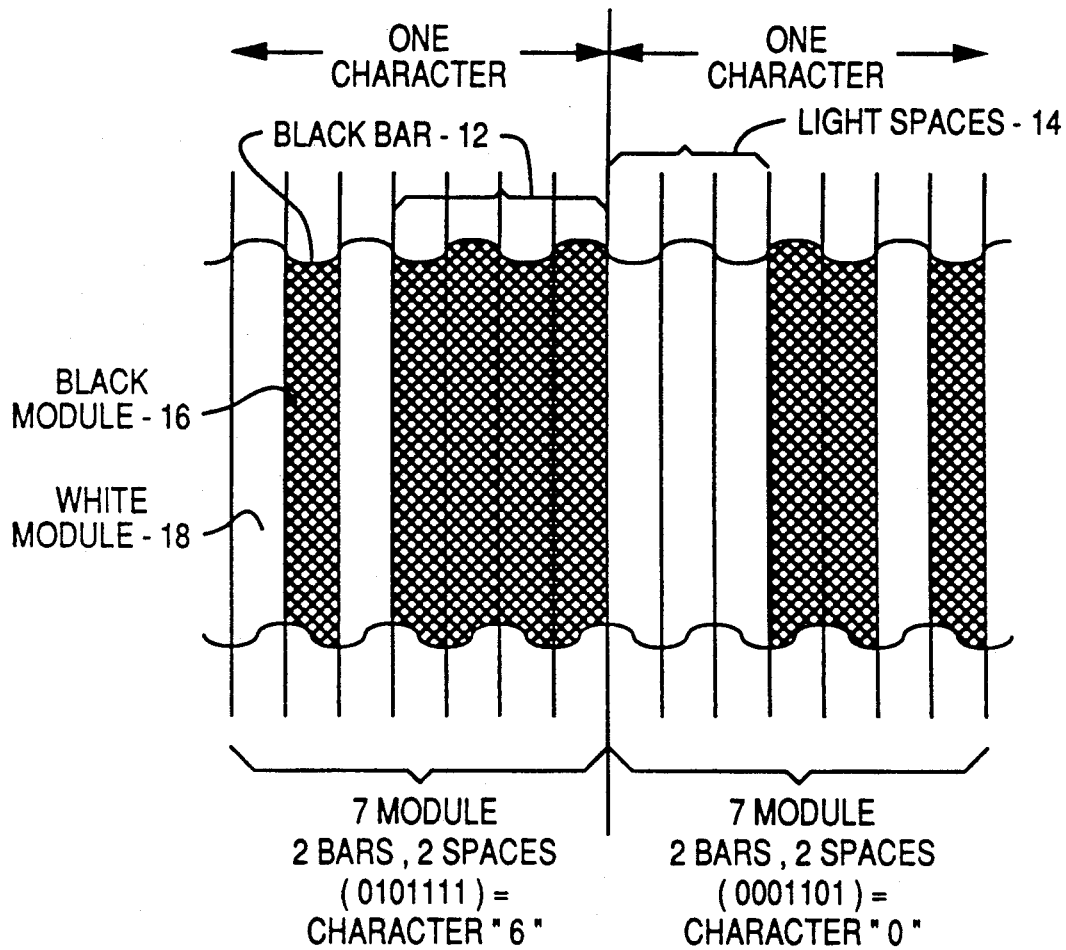
FIG. 2 is a graphical representation of the character structure of the UPC symbol.
FIG. 3 is a table showing the code structure of the UPC symbol character.

Referring now to FIG. 2, there is shown a graphical representation of the character structure of the UPC symbol. As shown, each encoded UPC character is made up of two dark bars 12 and two light spaces 14 each composed of a different number of modules. By assigning a 1 which corresponds to the black module 16, and a zero, which corresponds to a white module 18, the left hand character represents (0101111) which denotes the character 6, and the right hand character represents (0001101) which denotes the character 0. The structure of the character code is not uniquely determined by each character, but is different according to which side of the center band pattern the character is located on. It is also arranged that the light modules and the black modules are reversed as the character is located on the right or left side of the symbol 20, and as a result an odd number of black modules is included in each character code on the left hand side and a even number of black modules is included in each character code on the right hand side of the symbol, as indicated in FIG. 3. This parity relation provides information for determining the read-out direction of the symbol. With this arrangement, the left-hand characters always start with light bars and the right-hand characters always start with dark bars (reading left to right). The whole structure of the character codes is as shown in the Table in FIG. 3. It should be noted that a number of dark modules in each of the left side characters is always three or five while the number of dark modules is always two or four in the right hand characters. These characteristics are used as a parity check. The left side characters have odd parity while the right side characters have even parity.

Figure 4A:
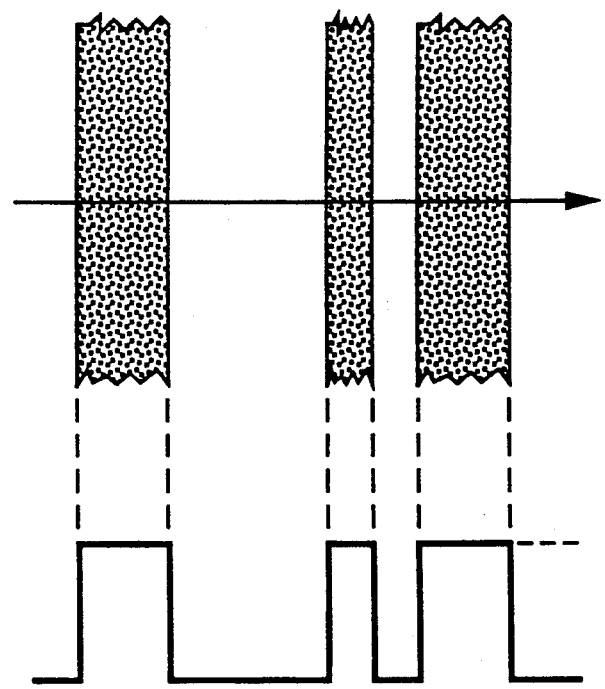
FIGS. 4A and 4B are a graphical representation of the bar pattern and the transformed binary symmetrical signal.
Figure 4B:
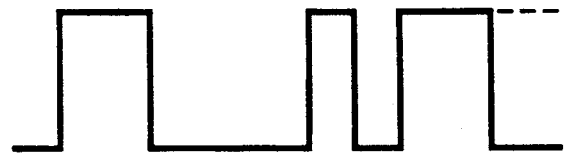

After a character is scanned, each module is assigned a binary value. Thus, as shown in FIGS. 4A and 4B, scanning of the modules in the direction as noted, a binary 1 signal is generated upon the sensing of a black bar, while a binary 0 signal is generated upon the sensing of a light bar or space. Because of problems in printing, it is uncommon for the width of the light bar and the black bar to be of the ideal value. Therefore, in decoding the UPC symbol, this condition must be taken into consideration.

In addition, the tolerances for a UPC symbol or a tag are larger for the space that starts or ends a character. Because of the print condition of the bar and space alluded to above, it has been found that the dimension tolerances between similar edges are better than between dissimilar edges. That is, measuring the distances between the trailing edges of adjacent bars and spaces, or measuring the distances between the leading edges of adjacent bars and spaces, produces data which gives high recognition efficiency to the system.

Figure 5:
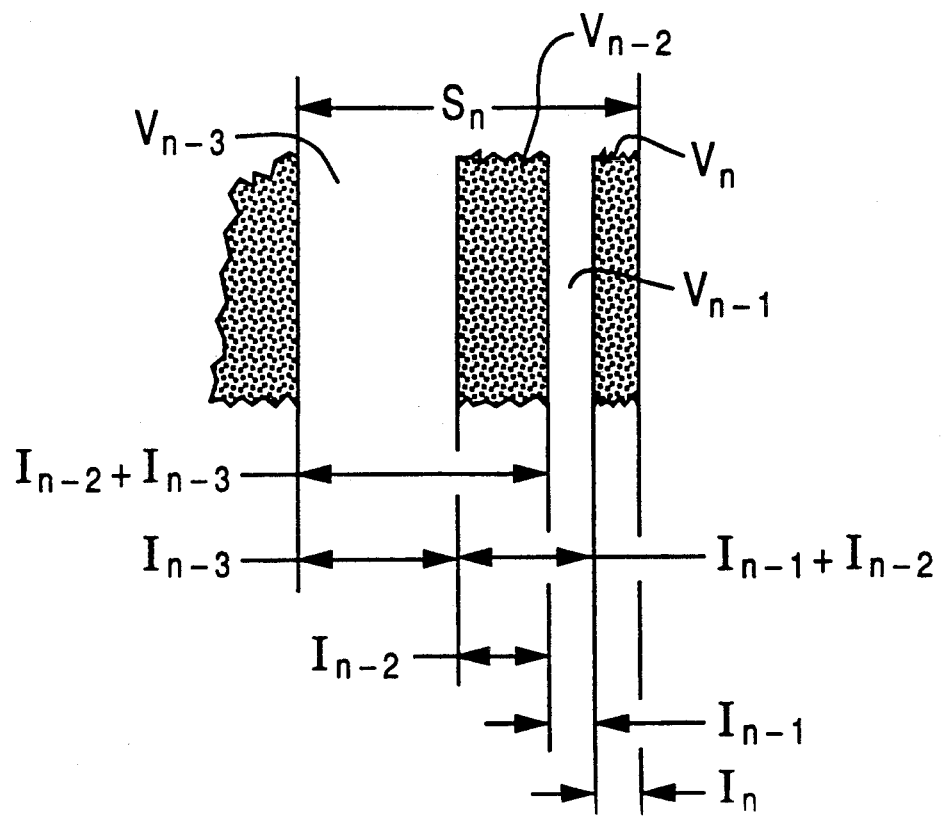
FIG. 5 is a graphical representation of a bar code illustrating the dimensional relationships utilized in the present recognition system.

Referring now to FIG. 5, there is illustrated the present method for recognizing the characters represented by the pattern of the UPC bar code as shown in FIG. 1. As previously described, each character comprises two dark bars and two white bars or spaces. Representing each bar and space as an interval, it will be seen that each character is composed of four intervals, where each interval is composed of the same background, either dark or white. To represent the most recent interval that has been sensed by the scanner, the designation $I_n$ is used, with the designation $V_n$ representing the bar for that interval. The designation $I_n$ is an 11 bit binary number generated in a manner to be described hereinafter. To designate the interval preceding the current interval, the notations $I_{n-1}$ and $V_{n-1}$ are used. For the interval before that, the notations $I_{n-2}$ and $V_{n-2}$ are used and so on. The sum of the four consecutive intervals as scanned by the scanner is shown in FIG. 5 by the notation $S_n$ where $S_n$ equals $I_n$ plus $I_{n-1}$ plus $I_{n-2}$ and $I_{n-3}$. For each interval scanned, the system examines the three preceding scanned intervals together with the currently scanned intervals and assigns a hexadecimal value. Each interval that is scanned is then classified as a bar (binary 1) or a space (binary 0) in accordance with the UPC standards found in the UPC Symbol Specification Manual, published Jan. 1, 1986 by the Uniform Code Council of Dayton, Ohio. If $V_n$ is a binary 1 (bar), then $I_n$ plus $I_{n-1}$ plus $I_{n-2}$ are compared to one-half $S_n$, 23/64 $S_n$ and 41/64 $S_n$. If $S_n$ is seven, then one-half $S_n$ is 3.5, 23/64 $S_n$ is approximately 2.5 while 41/64 $S_n$ is approximately 4.5. These values are used in decoding the data for the presence of a bar or a space, as will be described more fully hereinafter.

From this comparison two sets of weights can be found. Each of these weights will be either 2, 3, 4 or 5. From these weights the system will determine if a character is odd or even parity. Further utilizing these weights, the system will establish the characters 0, 3, 4, 5, 6 and 9. However, two sets of ambiguous characters are found. The characters 1 and 7 are ambiguous, that is, both have the same apparent configuration, and also the characters 2 and 8. To distinguish between the characters 2 and 8 requires finding if the interval $I_{n-1}$ of each character is greater than the interval $I_{n-2}$. If greater, the character is 2. Odd parity 1 and 7 can be separated by determining if the interval $I_n$ is greater than interval $I_{n-1}$. If in this case it is greater, the character is a 1. Even parity 1 and 7 requires that the term 21/32 $I_{n-2}$ is greater than $I_{n-1}$. In this latter case, if the term is greater, the character is a 1. In all these cases, the single interval was all used to determine the ambiguous characters.

Upon the scanning of each interval, the system will sum the three previous intervals together with the currently scanned interval and then compare the sum of these four intervals $S_n$ (FIG. 5) with the previous sum $S_n$ generated, to determine if they are equal within a predetermined limit. Thus, a signal EQUAL indicating equality will be generated if 27/32 $S_n$ is less than $S_n$-4 and $S_n$ is greater than 27/32 $S_n$-4 and no error is detected. An error condition exists where the width of an interval exceeds the predetermined count.

Referring to FIG. 1, it will be seen that the bar code symbol 20 has left and right margins and a center band portion of the code. When scanning from left to right as viewed in FIG. 1, the left margin will be characterized as the in margin while the right margin will be characterized as the out margin. Similarly, the left portion of the center band will be characterized as the in center band and the right portion of the center band will be characterized as the out center band. These characteristics are reversed when the scanning takes place from a right to left direction. It will thus be seen that upon the scanning of each interval, the system will apply the above cited logic tests to determine the characteristics of the scanned interval, which characteristics are embodied as part of a binary hexadecimal number together with the additional binary bits generated for use in recognizing a character contained in the hexadecimal number being outputted at that time. As pointed out previously, each interval scanned will result in the outputting of a hexadecimal number which contains four binary-coded decimal (BCD) bits with only a portion of the hexadecimal numbers outputted being valid. For a complete disclosure of the procedure for decoding a UPC symbol, reference should be made to U.S. Pat. No. 4,282,426, which issued Aug. 4, 1981 on the application of Neseem et al and assigned to the assignee of the present invention.

Figure 6:
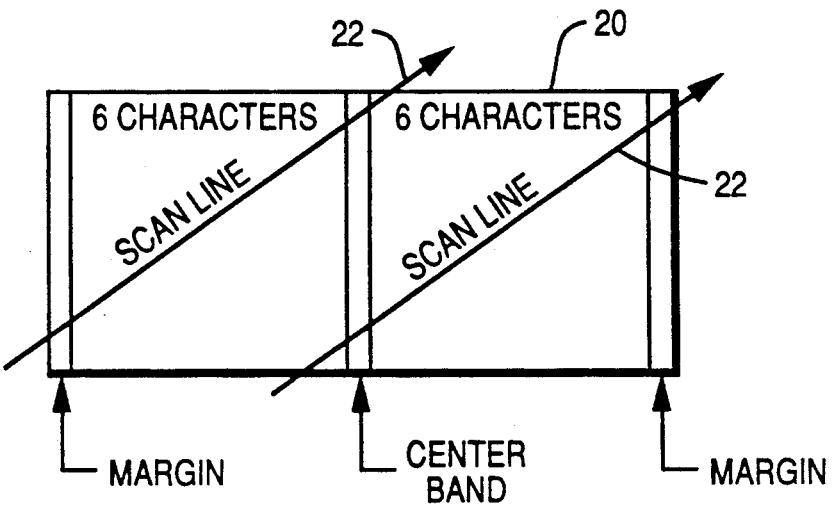
FIG. 6 is a graphical representation of a UPC symbol showing the path of the scan lines for scanning a complete bar code label.
Figure 7:
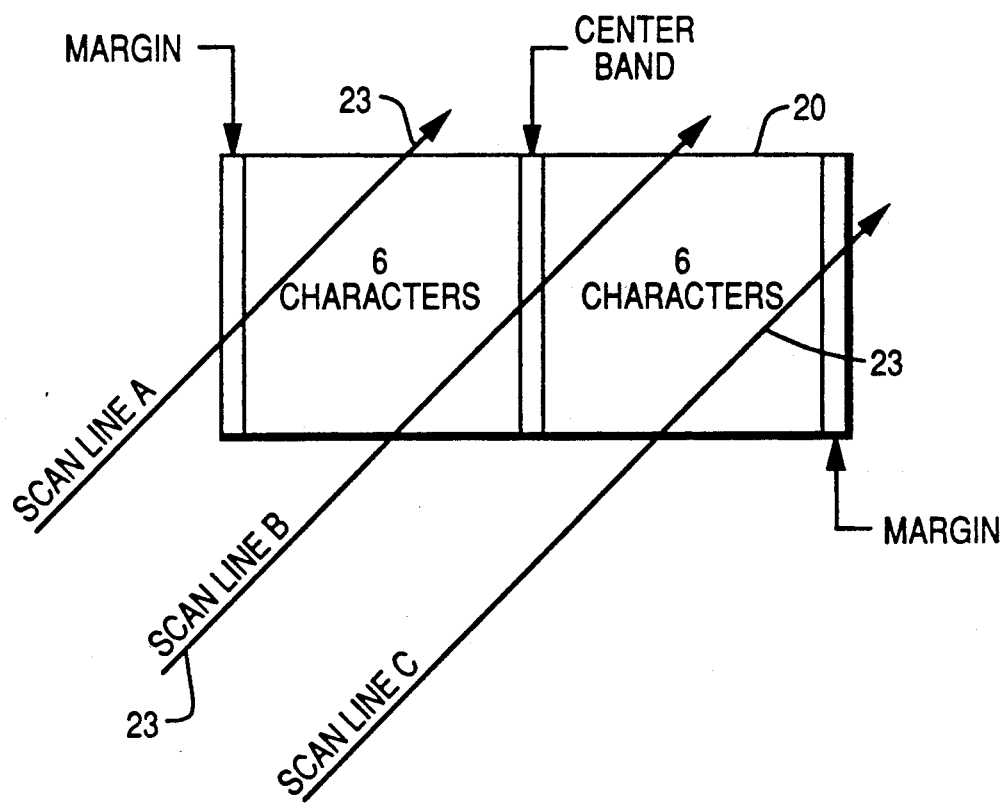
FIG. 7 is a graphical representation of a UPC symbol showing the path of the scan lines for producing partial readings of the bar code label which are combined by } the present invention to produce a valid reading of the full UPC symbol.

Referring to FIG. 6, there is shown a diagrammatic representation of a UPC symbol 20 being scanned by scan lines 22. As shown, each scan line 22 will scan a half a label which includes either an in margin plus six characters and an in center band or an out center band, six characters and an out margin. The half symbols are put together to form a full symbol. In the present invention as illustrated in FIG. 7, the scan lines 23 (lines A and C) scan a portion of the symbol 20 without scanning both a margin and the center band, while scan line B scans only the center band and portions of numerical characters in both the left and right side portions of the symbol. The portion of the symbol 20 scanned by each of the scan lines 23 will be hereinafter referred to as a "partial". The present invention examines the data generated by each of the scan lines 23 to see if there is enough information in each of the partials to put together a valid full or half UPC symbol.

Referring now to FIG. 8, there is shown a block diagram of the bar code decoding system of the present invention including an optical scanner 24 which causes a laser beam to generate the plurality of scan lines 22, 23 (FIGS. 6 and 7) used to scan the UPC symbol 20. As is well known in the art, the scan lines 22, 23 scanning the UPC symbol 20 will be reflected from the bars and spaces which compose the UPC symbol back through the optical scanner wherein a photodetector (not shown) converts the reflected light into electrical signals. A video amplifier and a latch circuit (not shown) located in the optical scanner 24 generates, in response to the generated electrical signals, digital pulses STV indicating a space-to-bar transition when going high and a bar-to-space transition when going low.

These pulses representing time intervals are transmitted over line 26 to a pattern and recognition chip (PR) 28 which will assemble the intervals into a block of data representing four characters after which the chip 28 will transmit the block of data over bus 30 to a character decode processor 32. As will be described more fully hereinafter, the character decode processor 32 will decode the characters from each block of data transmitted from the chip 28 and transmit the decoded characters over bus 30 to the chip 28 which outputs the decoded characters over bus 36 to a microprocessor 38. As will be described hereinafter, the microprocessor 38 will examine the decoded characters to see if there is enough information in the decoded characters to form a complete UPC symbol. If there is, the microprocessor will operate over line 42 a lights and speaker unit 40 to operate a light indicating a valid read and/or operate a speaker to produce a tone signal indicating a valid read. The microprocessor 38 will also output over bus 36 the data representing the complete UPC symbol, which normally identifies the merchandise item to which the symbol 20 is attached, to the chip 28 from where the information is transmitted over line 44 to a host terminal 46. The host terminal will transmit the information representing the identity of the merchandise item over bus 48 to a remote processor 50 which, utilizing this information, will look up the price of the merchandise item in price look-up tables located in the processor in a manner that is well known in the art. The price of the purchased merchandise item is then transmitted back over bus 48 to the host terminal which will operate a display (not shown) to display the price of the purchased merchandise item and control a printer (not shown) to print on a customer receipt the price of the item.

Referring now to FIG. 9, there is shown within the dotted outline 51 a block diagram of the chip 28 (FIG. 8) together with the decode processor 32 and the microprocessor 38. The chip 28 includes a counter 52 which receives over line 26 the video signals STV and the 40 megahertz clock signals CLK over line 54 from an oscillator (not shown) located on the chip 28. The video signals STV may indicate either a space-to-bar transition or a bar-to-space transition as previously described. The counter 52 counts the 40 megahertz clock signals that occur between two consecutive transitions to generate an output count representing the width of the bar 12 or space 14 (FIG. 2). The output count CNB will be transmitted over buses 56 and 58 to a multiplexer unit 59 and to a filter 60 which will look for at least four equal characters in a row in the CNB output count being transmitted over bus 58. Upon detecting four characters in a row, the data representing the four characters is transmitted over bus 62 to the multiplexer unit 59. As will be described more fully hereinafter, the multiplexer unit 59 will be evaluated to transfer the data appearing on bus 62 over buses 30 and 64 to a 256 word FIFO memory unit 66 for storage therein. The multiplexer unit 59 is enabled when the memory unit 66 becomes half full. Prior to this occurrence, the multiplexer unit 59 will transfer only the output count CNB appearing on bus 58 to the memory unit 66.

Associated with the FIFO memory 66 is a logic and address unit 68 which may be coupled to a remote 16K static RAM memory unit 70. The logic and address unit 68 controls the operation of the multiplexer 59 and the FIFO memory unit 66 such that the character data outputted by the filter 60 and stored in the memory unit 66 will be transmitted over bus 72 through the logic and address unit 68 and over line 74 to the static RAM memory unit 70 when the memory unit becomes full. Coupled to the memory unit 66 over bus 30 and to the RAM memory unit 70 over line 76 which is part of bus 30 (FIG. 8) is the character decode processor 32 (FIG. 8) which will read the character data stored in the memory unit 66 and the RAM memory unit 70.

The character decode processor 32 will decode the received character data to detect the presence of four consecutive characters and characterize the characters valid, invalid or suspect which may be valid or invalid and then transmit the decoded characters over buses 30 and 98 and through a register 240 to a buffer RAM memory unit 80 located on chip 28. The character data is then stored in a storage register 82 from where the microprocessor 38 will retrieve the character data over buses 84 and 36. Coupled to the buses 36 and 88 is a command logic unit 90 in which is stored commands from the microprocessor 38 telling the decode processor 32 which type of code to use in decoding the character data received from the memory units 66 or 74 or to go into a reset mode. This information is transmitted to the decode processor over buses 92 and 30.

Further associated with the decode processor 32 is a buffer RAM logic and address unit 94 which controls the storage of the character data transmitted from the decode processor 32 to the buffer RAM memory unit 80. As will be described more fully hereinafter, the microprocessor 38 utilizing the character data transmitted from the decode processor 32 and stored in the buffer RAM memory unit 80 will attempt to put the received character data together to produce a full symbol comprising 12 characters, a margin band and a center band. Once it has derived a full symbol, the microprocessor 38 will transmit this data over bus 36 to a OCIA communication unit 96 from where the data appearing on line 44 as RDATA is transmitted to the host terminal 46 (FIG. 8) where the data is used to look up the price of the merchandise item in the remote processor 50.

Referring again to FIG. 9, there is shown coupled to the bus 36 is an output bus 98 from an interval counter unit 100 which receives over line 102 the video transition signals STV. The interval counter 100 is always counting the transitions that are transmitted over the input line 26 to the counter 52. The interval counter 100 is a 16 bit counter whose output count enables the microprocessor 38 to determine whether there is presently being scanned by the the optical scanner 24 a coded symbol. If a coded symbol is not being scanned by the optical scanner 24, the number of transitions outputted by the interval counter 100 will be very low but as soon as a coded symbol is positioned over the optical scanner, the number of transitions will increase. The microprocessor 38 will monitor the output of the interval counter 100 to detect when a read operation is occurring.

Referring now to FIG. 10 there shown is a detailed block diagram of a frame capture buffer which is part of the counter 52 (FIG. 9) and which is used to generate the count CNB representing the width of an interval. Included in the counter 52 is a counter logic unit 104 which receives the transition signals STV over line 26. When a transition occurs, the counter logic unit 104 will enable the counter 106 to operate thereby counting the number of 40 megahertz clock pulses appearing on line 54. Upon the occurrence of the next transition signal STV, the counter logic unit 104 will stop the operation of the counter 106 whose output count will represent the width of the interval between consecutive transitions and will be transmitted over bus 108 for storage in a storage register 110 under the control of the signal INA which is transmitted over line 114 from a timing logic unit 111 (FIG. 19) located on the chip 28. The counter 106 will be reset upon the occurrence of the second transition signal STV and will start counting upon the occurrence of the next interval. Upon the subsequent occurrence of the next STV transition signal, the output count of the counter will be transmitted over bus 108 to the storage register 112 which is enabled by the signal INB appearing on the input line 116 and transmitted from the timing logic unit 111.

It will be seen from this construction that the storage register 110 will store the data representing the even number of intervals while the storage register 112 will store the odd number of intervals. The storage register 110 is controlled by a signal OUTA transmitted from the timing logic unit 111 over line 118 which is also transmitted to a multiplexer 120 enabling the register 110 to output the interval data stored therein over bus 122 to the multiplexer. In a similar manner the storage register 112 receives the control signal OUTB over line 124 from the timing logic unit 111 which is also transmitted to the multiplexer 120 over line 126 enabling the storage register 112 to output the count over bus 122 for storage in the multiplexer. It will be seen that the multiplexer 120 will store in sequence the interval counts CNB representing the width of each of the consecutive intervals (FIG. 5) that make up a character. The interval counts CNB are transmitted over bus 56 to the filter 60 (FIG. 9) which assembles four consecutive intervals comprising a character into a block of data for transmission to the decode processor 32.

Referring now to FIG. 11, there is shown a detailed block diagram of a portion of the control circuits in the logic and address unit 68 (FIG. 9) for addressing the FIFO memory unit 66 (FIG. 9) and for controlling the operation of the multiplexer 59. Included in the unit is a logic unit 130 which receives over line 132 the counter signal CNDV from the timing logic unit 111 (FIG. 19) and over line 76 the read signal DSPRD from the decoder processor 32. Further included in the control circuits is an In address counter 136 which generates addresses for use in storing data in the memory unit 66 (FIG. 9) and an Out address counter 138 which is used to address the memory unit 66 when data is to be removed from the memory. When a word of data appears on bus 64 transmitted from the counter 52 or the filter 60 (FIG. 9) through the multiplexer 59 for storage in the memory unit 66, the logic unit 130 will output the control signal INRAM over line 134 which will increment the counter 136 whose output count represents the address in the memory unit 66 in which the word is to be stored. Whenever the character decode processor 32 reads a word of data from the FIFO memory unit 66, the signal DESEN appearing on line 137 will increment the out address counter 138. The output count of the counters 136 and 138 are transmitted over buses 140 and 142 respectively to a logic unit 144 which transmits the data over bus 72 to the FIFO memory unit 66.

Further included in the control circuits is a difference counter 148 which senses the status of the counters 136 and 138 by receiving the control signal DSIN over lines 150 and 152 indicating the operation of the counter 136 and the control signal INRAS over line 154 indicating the operation of the counter 138. The difference counter 148 functions to determine the current level of stored data in the FIFO memory unit 66. Depending on the condition of the FIFO memory unit 66, the difference counter 148 will output the signal RAE over line 156 when the FIFO memory is empty, the signal RA1/2 when the memory is one-half full, the signal RA3/4 when the memory is three-quarters full and the signal RAF when the memory is full. These signals are transmitted to the logic block 130 which outputs the signals over buses 146, 30 and 92 (FIG. 9) to the command logic unit 90 where they are stored in a status register (not shown). The status register is read by the microprocessor 38 over buses 30 and 88. To determine the presence of data in the FIFO memory unit 66 which is to be accessed by the microprocessor. This structure enables the system to process the large amount of data that is generated by the optical scanner 24 including the partial readings of the symbol 20. The signal RA ½ also enables the logic unit 130 to output a control signal over line 65 to the multiplexer 59 (FIG. 9) enabling the multiplexer to output over buses 30 and 64 to the memory unit 66 the character data outputted by the filter 60.

Referring now to FIG. 12, there is shown a detailed block diagram of the pattern recognition filter 60 (FIG. 9) for applying first predetermined relationships to the data in which the interval counts CNB appearing on the bus 58 are transmitted over bus 160 into the storage register 162 which, after a predetermined delay, will output the count N-1 over bus 164 to one input of adder 166 which receives at its other input the count N over bus 168. The sum of the two intervals are transmitted over bus 170 to the two stage register delay unit 172 which will output the count N+N−1 over bus 174 to one input of an adder 176. The other input of the adder 176 receives over bus 178 the output count of the adder 166 which in this case is count N−2+N−3 with respect to the count N+N−1 appearing on bus 174. The adder 176 will output the sum of the interval counts appearing on input buses 174 and 178. This sum constitutes the sum of four consecutive intervals which is the width of a character comprising two bars and two spaces and which is transmitted over bus 180 to a storage register 182. The register 182 will output the sum of the four intervals over bus 184 to a four stage storage register delay unit 186 and over bus 188 to a comparator unit 190 and over bus 192 to a multiplexer 194. The sum of the four intervals stored in the storage register delay unit 186 will be outputted over bus 196 to the other side of the comparator 190 and to the other side of the multiplexer 194. The sum of the four intervals appearing on bus 196 will constitute the four intervals previous to the sum of the four intervals appearing on the bus 188 and inputted onto the other side of the comparator 190.

The comparator 190 will compare the sum of the four intervals appearing on the buses 188 and 196 and will output the greater signal DGTH over line 198 to the multiplexer 194 if the sum appearing on the bus 196 is greater than the sum appearing on the bus 188. If the sum appearing on bus 190 is less than the sum appearing on bus 188, the comparator 190 will output the lesser signal DLSH over line 200 to the multiplexer 194. The signals DGTH and DLSH enable the multiplexer to receive the largest of the sum of the four intervals appearing on buses 196 and 192. The selected sum will be outputted over bus 204 to a multiplier 206 which will multiply the sum by 13/16. The resulting count will be outputted over bus 208 to a comparator 210 which also receives over bus 212 the count representing the smallest sum of the four intervals compared. The comparator 210 will compare the counts to see if they are equal within plus or minus 3/16 of each other. If they are, the equal signal EQUAL is transmitted from the comparator 210 over line 214 to a filter logic unit 216 which will output a pulse over line 218 to a counter 220 every time the signal EQUAL occurs. The counter 220, upon counting up to three pulses, will output the signal THREE over line 222 to a 20 stage shift register 224 which has stored the four characters appearing on the input bus 58. The signal THREE indicates that the interval count, stored in the register 224, represents four consecutive characters of equal width. The signal THREE will enable the register 224 to output the interval count representing at least four equal characters over bus 62 to the multiplexer 59.

Referring now to FIG. 13, there is shown a detailed block diagram of the control circuit located within the dotted outline 42 in FIG. 9 and associated with the decode processor 32 and the microprocessor 38 for controlling the transfer of data. The interval count representing four consecutive characters stored in the FIFO memory unit 66 (FIG. 9) is outputted over buses 64, 30 and 92 to a multiplexer 230 (FIG. 13) located in the command logic unit 90 (FIG. 9). The multiplexer 230 may also receive over bus 231 command data stored in the command register 232 located in the logic unit 90 and which was transmitted over buses 36 and 88 from the microprocessor 38 (FIG. 9). The multiplexer 230 will output the interval count to a 12 bit register 234 from where the count is inputted into a multiplexer 236 which is controlled by a control signal COD5 appearing on line 238 and outputted by the timing logic unit 111 (FIG. 19) enabling the multiplexer to output the interval count over bus 30 to the decode processor 32.

The decode processor 32, as will be described more fully hereinafter, will decode the interval counts representing four equal characters as valid, invalid or suspect characters and outputs blocks of data comprising four consecutive characters over buses 30 and 98 to a storage register 240 (FIGS. 9 and 13). The register 240 receives the write signal DSPWR outputted by the decode processor 32 and transmitted over line 242 of bus 98 enabling the register to output the blocks of data over bus 244 to a buffer RAM storage unit 246 comprising a 128 by 8 word storage unit located in the buffer memory unit 80 (FIG. 9). The storage unit 246 is controlled by signals outputted from the buffer RAM logic and address unit 94 (FIG. 9) which includes a buffer RAM logic unit 248 (FIG. 13) over bus 266 and receiving the read signal RD1 from the decode processor 32 over line 250 of bus 252 (FIG. 9).

Associated with the buffer RAM logic unit 248 is a difference counter 254 which functions in the same manner as that of the difference counter 148 (FIG. 10) to control the flow of data to and from the buffer RAM storage unit 246. The difference counter 254 will receive over line 256 the up/down enable signal OUDEN outputted from the BUFRAM logic unit 248 in response to the logic unit 248 receiving the read signal RD1 over line 250 and the write signal DSPWR over line 258 from the decode processor 32. When data is stored in the storage unit 246, the BUFRAM logic unit 248 will output the increment signal INC IN over line 259 to an In counter unit 260 incrementing the counter unit to output the count over bus 262 to a multiplexer 264. The multiplexer will output the count over bus 266 as the address in the storage unit 246 in which the data is to be stored.

When the data representing the interval count is to be transferred to the microprocessor 38, the BUFRAM logic unit 248 will output the load signal STORA over line 268 to the storage register 82 (FIG. 9) which stores the data prior to transmitting the data over buses 84 and 36 to the microprocessor 38 (FIGS. 9 and 13). As each block of data is read out from the storage unit 246, the logic unit 248 will output the increment out signal INC OUT over line 270 to an out counter unit 272 which signal increments the counter unit whose output count is transmitted over bus 274 to the multiplexer 264. As the blocks of data are transferred from the storage unit 246 to the register 82 and subsequently to the microprocessor 38, the difference counter 254 will output a signal to the logic unit 248 indicating the storage condition of the storage unit 246. If the storage unit 246 is full, the counter will output the signal DRFU over line 276 indicating that the storage unit 246 is full.

As the storage unit 246 is emptied, the difference counter 254 will sequentially output the signal F3/4 over line 278, and the signal F1/4 over line 280 indicating when the storage unit is three-quarters full and one-quarter full respectively. When the storage unit 246 is empty, the difference counter unit 254 will output the RAM empty signal DREM over line 282 to the logic unit 248 enabling the unit to output the load signals STORA over line 268 and the control signal INC IN over line 259 and INC OUT over line 270. The storage unit 246 is a static RAM that requires an in address and out address enabling the data to be stored and to be removed from the unit. Each time a block of data is stored in the storage unit 246, the $I_n$ counter 260 is incremented by 1. When each block of data is transmitted from the storage unit 246 to the storage register 82, the Out counter 272 is incremented by 1. The difference counter 254 checks the difference between the output count of the counters 260 and 272 to indicate how much data is stored in the storage unit 246. When the storage unit 246 becomes empty, the output count of the counter 260 and 270 should be the same at which time the difference counter 254 will output the RAM empty signal DREM over line 282.

Referring now to FIGS. 16A and 16B, there is disclosed a flow chart of the operation by which the decode processor 32 (FIG. 9) will decode the characters from the blocks of interval counts representing four consecutive equal characters and transferred from the memory unit 66. The decode processor 32 will start (block 286) by transferring new character data from the multiplexer 236 (FIG. 13) and will examine the data to see if they contain three or more equal UPC characters (block 290). The width of four intervals comprising each UPC character has to be within 3/16 of each other to be equal. If they are not, the processor will return over lines 292 and 294 to block 286 and obtain new data from the multiplexer 236 (block 288). If the new data contains at least three equal UPC characters, the processor will examine the data to see if they contain more than seven equal UPC characters (block 296) indicating that the optical scanner 24 (FIG. 1) is reading background information rather than a coded symbol. If the data contains more than seven equal UPC characters, the processor 32 will return over lines 298 and 294 to block 288 to obtain new data. If the data does not contain more than seven equal characters, the processor will examine the data to determine if the data characters are bounded by a margin or a center band (block 300). If they are, the processor will then determine whether all the characters are valid UPC characters (block 302)(FIG. 16B).

As previously described with respect to FIGS. 4A, 4B and 5, each UPC character is comprised of two dark bars and two light bars each composed of a different number of modules. The processor 32 will apply second predetermined relationships to the data by examining examine the width of each adjacent bar-space combination in the characters to see if they contain between 1.5 to 5.5 modules. If they do, the character is a valid UPC character. If they don't, the character is an invalid character and the processor will return over lines 304 and 294 to block 288 to receive new data from the FIFO memory unit 66 (FIG. 9). If the bar-space combinations of each character fall within these limits, the processor will also apply third predetermined relationships to the data constituting a more stringent decoding procedure (block 306) by again examining the valid characters to determine if the number of modules contained within the width of each bar-space combination falls within +/−0.333 of a whole module existing within the previously cited limits. If they don't, the processor will proceed over line 308 and mark the character as suspect (block 310) in a manner that will now be explained.

Each of the characters in the symbol 20 (FIG. 1) and processed by the processor 32 are represented by a byte of binary bits in which four bits represents the numerical value of the character, one bit represents the parity of the character and another bit represents a suspect flag bit which is set by the processor 32 when the character is found to be suspect. The processor will examine the binary data representing each group of characters obtained from the memory unit 66 (FIG. 9) which may consist of up to six characters to see if any of the characters in that group are suspect. If half or more of the characters are suspect (block 312), the processor will abandon the group and return over lines 314 and 294 to block 288 (FIG. 16A) to receive new character data from the memory unit 66 (FIG. 9). If less than half of the characters in the group are found to be suspect, the processor will send the character data (block 316)to the storage unit 246 (FIG. 13) in the chip 28 from where the data is transmitted through the storage register 82 and over buses 84 and 36 to the microprocessor 38.

Referring now to FIGS. 17A-17D inclusive, there is shown a flow chart of the operation by the microprocessor 38 for joining the characters received from the decode processor 32 so that they constitute a full UPC coded label. The microprocessor will start (block 320)(FIG. 17A) by detecting whether the system passes a power up diagnostic operation (block 322). If the system does not pass this operation, the microprocessor will move over line 324 to turn off the laser in the optical scanner 24 (FIG. 8) and sound a tone a number of times to indicate a failure mode (block 326) and then blink a red light to indicate a failure mode (block 328). If the system passes the power up diagnostic operation, the microprocessor will determine if there has been a scanning operation by the optical scanner unit 24 (FIG. 8) (block 330) and then check the status register (not shown) in the command logic unit 90 to see if there is any data stored in the storage register 82 (FIG. 9) (block 332). If there isn't data stored in the register, the microprocessor will check (block 334) to see if 60 milliseconds has elapsed since receiving the last character data from the storage unit 82 (FIG. 13). If no data has been received during this time period indicating that a coded symbol is not being read by the optical scanner 24 (FIG. 8), the microprocessor will return over line 336 to block 330 checking to see if a scanning of a label has occurred.

Figure 17B:
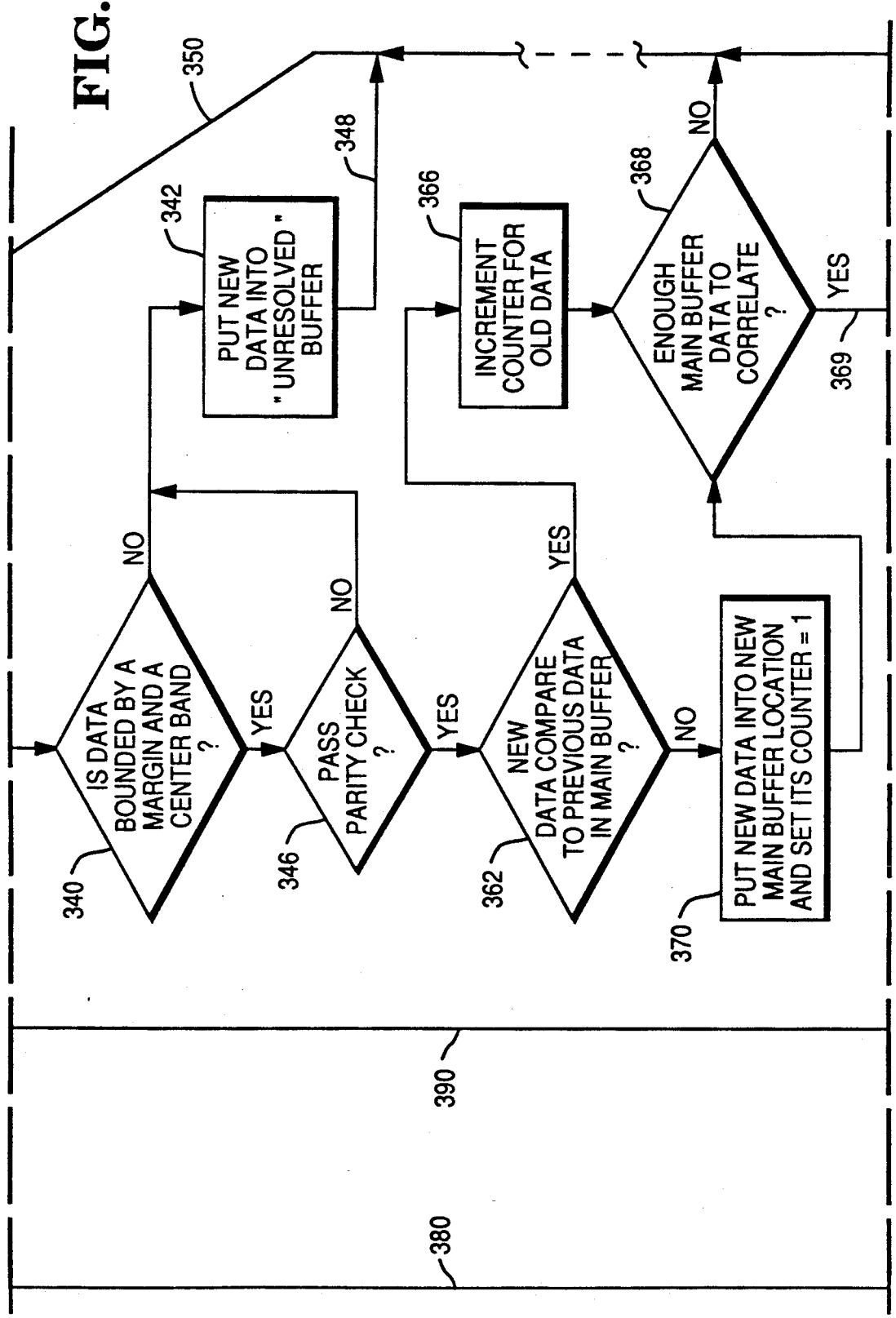

If there is data stored in the storage register 82, the microprocessor will apply fourth predetermined relationships to the data by reading the data from the register (block 338) and check that the data is bounded by a margin and a center band indicating that the character data constitutes a valid half symbol (block 340)(FIG. 17B). If the data is not bounded by a margin and a center band which in the present application may consist of a partial scan of the symbol (FIG. 7), the data is put into (block 342) a buffer 344 (FIG. 15) characterized as an "unresolved" buffer and located in the microprocessor 38 (FIG. 9). If the data is bounded by a margin and a center band indicating that the character data represents a valid half of the coded symbol 20 (FIG. 6) and is generated by the scan lines 22, the microprocessor will check the binary bits constituting the character to see if they represent an odd or even parity (FIG. 3) so as to locate the side of the coded symbol the data characters are found (block 346). If the character data does not pass the parity check, the data is put into the "unresolved" buffer 344 (block 342) and the microprocessor will return over lines 348 and 350 to block 330 (FIG. 17A) to determine if any new data has been stored in the storage register 82.

If the character data does pass the parity check, the microprocessor 38 will store the character data in a row of a main buffer indicated generally by the numeral 352 (FIG. 14) located in the microprocessor 38 (FIG. 9). As shown in FIG. 14, the main buffer 352 includes rows of storage areas 354 in which each row is coupled to one of an associated multi-stage character counter 356A-356H inclusive. Each stage 358 of each of the character counters 356A-356H inclusive will count and store the number of times a particular numerical character is inserted in the corresponding position in its associated row 354 in the buffer 352 as a result of a scanning operation by one of the scanning lines 22 (FIGS. 6 and 7). Thus if the character 2 is positioned in the second column in the first row 354 of the buffer 352, the second stage 358 of the character counter 356A will store a count of 1 at that position as shown in FIG. 14. The microprocessor 38 utilizing a comparator 359 (FIG. 9) will then compare the character data stored in the buffer 352 with character data previously stored in another row in the buffer to see if they contain the same characters (block 362). If they do compare, the microprocessor will increment (block 366) the associated character counter 356 by one in the manner described previously. This sequence is illustrated in the second row 354 of the buffer 352 and in the counter 356B.

As previously described, the optical scanner 24 will generate a plurality of scanning lines 22 (FIG. 6) which scan along the same line a number of times to generate the same block of character data. As each block of character data is stored in the buffer 352, the microprocessor will determine how many times the same character has been stored in the same position in the buffer by adding up the counts stored in the same stages 358 in the counters 356A-356H inclusive (FIG. 14) representing the number of times the corresponding character has occurred in that position during a scanning operation. The microprocessor will add the count stored in the counters 356A-356H inclusive to see how many blocks of character data representing a full half symbol has been stored therein (block 368) (FIG. 17B) to determine if there is sufficient data to correlate a block of character data utilizing the previously described correlating sequence. In the present embodiment, at least five blocks of valid character data have to be stored in the buffer 352 to constitute sufficient data to correlate a block of valid character data. If there are not enough blocks of data stored in the buffer 352, the microprocessor will return over line 350 to block 330 and obtain new data from the storage register 82 (FIG. 13).

If all of the characters in the new block of data stored in the buffer 352 do not compare (block 362)(FIG. 17B) to all of the corresponding characters in the blocks of data previously stored in the main buffer, the microprocessor 38 will store that new block of data in a new row 354 of the main buffer 352 (FIG. 14) and set the corresponding stages 358 of its associated character counter 356 to 1 (block 370). This sequence is illustrated in the first, third and fourth rows 354 in FIG. 14. The microprocessor will then check to see if the buffer 352 has enough blocks of data stored therein to correlate a half label (block 368). If it doesn't, the sequence is repeated until there are enough blocks of data stored in the main buffer to correlate a half label. The microprocessor will then over line 369 set a fast correlation flag in the flag register 371 (FIG. 9) (block 372) indicating that the optical scanner 24 is still scanning the coded symbol 20 after which the microprocessor checks the blocks of data stored in the main buffer 352 over line 379 to see if there is enough character data to constitute a valid symbol (block 374) (FIG. 17D). The fast correlation sequence shortens the time required to decode the symbol.

In determining if there is enough data to constitute a valid symbol when the fast correlation flag has been set, the microprocessor will check the number of times the same character has appeared in each column of the main buffer 352. In the present invention, for a fast correlation of the data to occur, the same character has to appear at least a minimum of four times in one of the columns 360 (FIG. 14) to constitute a valid character while allowing only one mismatch to occur. If this requirement is not found, the microprocessor will check to see if the fast correlation flag was set (block 376) (FIG. 17D) and if not indicating that the symbol is not being scanned, the microprocessor will clear all the counters in the data buffers 344 and 352 (FIGS. 14 and 15), sound a bad read tone and/or turn on a bad read light (block 378) and return over line 380 to the scan operation block 330 (FIG. 17A). If the fast correlation flag was set, the microprocessor will return over line 380 to block 330 to obtain new character data.

If there is sufficient number of characters in the main buffer 352 to constitute a valid half symbol (block 374), the microprocessor will compare the corresponding characters in each half symbol to see if there is one end character common in each half symbol indicating an overlapping relationship (block 382). If there are found more than one end character, the microprocessor will then check to see if a fast correlation flag was set (block 376) and if it was indicating that the scanner 24 is still scanning the coded symbol, the microprocessor will return to block 330 (FIG. 17A) to start a new correlation sequence. If the fast correlation flag was not set, the microprocessor will return to block 378 clearing all counters and data buffers, sound a bad read tone and/or turn on a bad read light requiring the checkout operator to repeat the scanning operation and then return to block 330 to initiate a new decoding operation.

If the microprocessor finds that there are less than two end characters in the data indicating the present of a valid symbol, the microprocessor will send (block 384) (FIG. 17D) the symbol data over bus 36 to the OCIA communication unit 96 (FIG. 9) located in the chip 28 (FIG. 8). The communication unit 96 will output over line 44 the data read from the coded symbol 20 (FIG. 6) to the host terminal 46 from where the data transmitted to the remote processor 50 enabling the remote processor to obtain the price of the item on which the coded symbol is located. The microprocessor will also sound the good read tone and/or turn on the good read light, and clear all counters and buffers. The microprocessor will then check to see if any new data has been stored in the storage register 82 (block 386) and will continue checking until no data is available from the chip 28. The microprocessor 38 will then return over line 350 to check for the presence of a scanning operation.

Figure 17C:
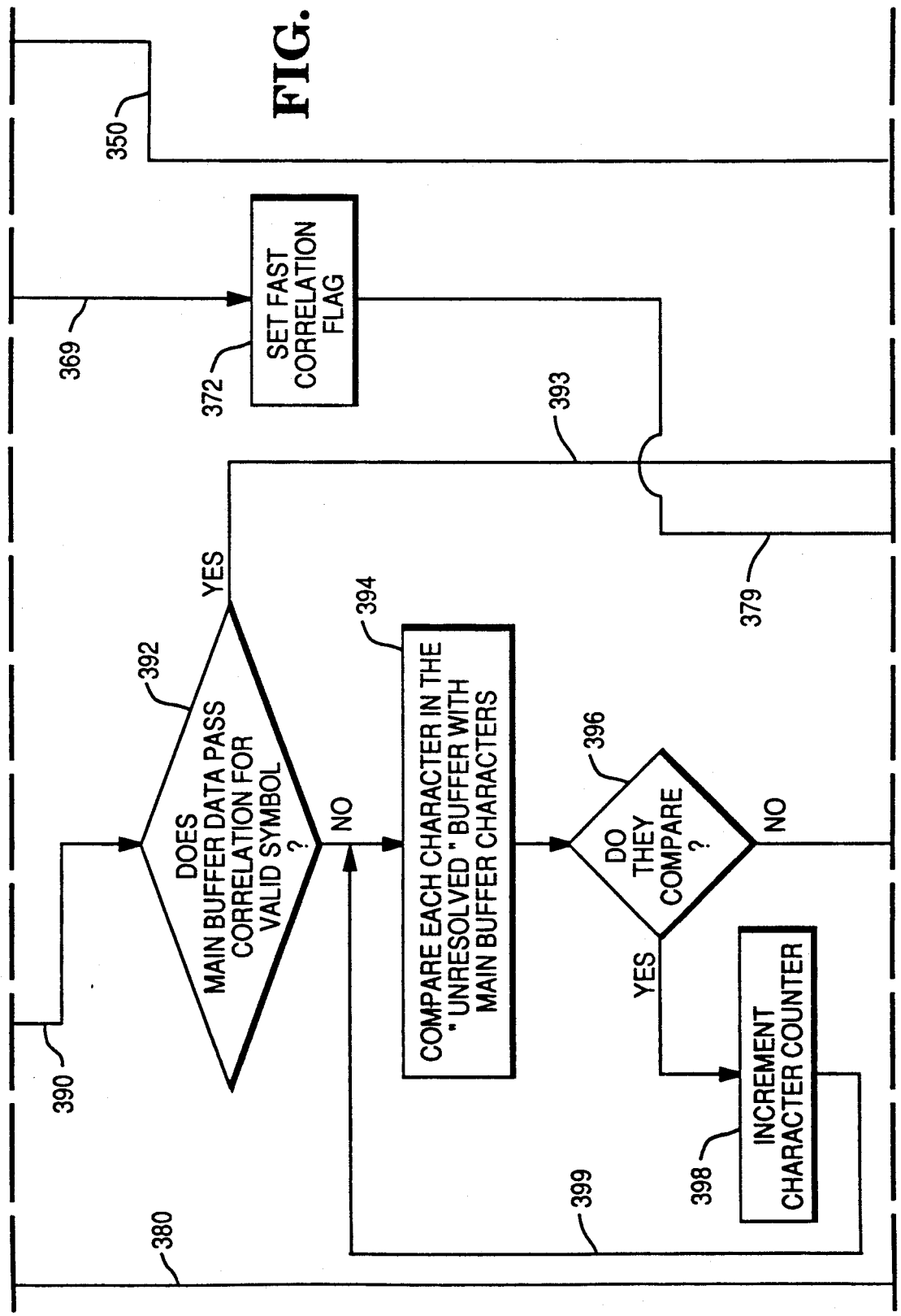
Figure 17D:
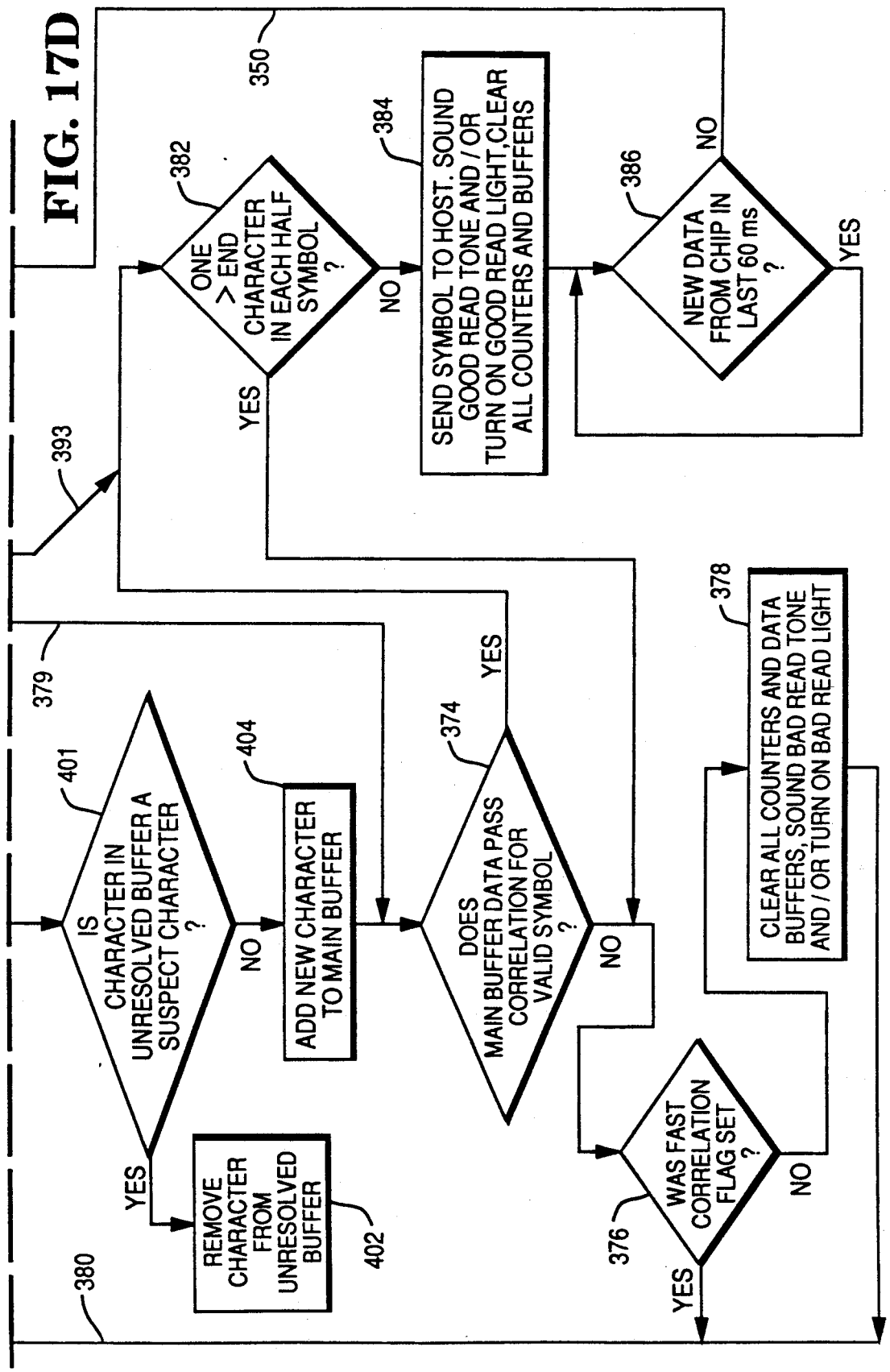

If 60 milliseconds has elapsed since new data has been transmitted to the storage register 82 (block 334) (FIG. 17A), the microprocessor will return over line 390 to examine the character data stored in the main buffer unit 352 (FIG. 14) to see if the data passes the correlation sequence as previously described to constitute a valid symbol (block 392) (FIG. 17C). If it does the microprocessor will return over line 393 to block 382 (FIG. 17D) to check the valid data to see if there is less than two end characters in an overlapping position (block 382)(FIG. 17D) with respect to each half of a valid symbol stored in the main buffer 352.

If the character data stored in the main buffer 352 does not pass this correlation examination for a valid symbol, the microprocessor will then compare each character of a partial reading (FIG. 7) stored in the unresolved buffer 344 (FIG. 15) with the sum of the characters occurring in the same position in the main buffer 352 (block 394) utilizing the counts in the character counters 356A-356H inclusive. If they compare (block 396), the microprocessor will increment (block 398)(FIG. 17C) the associated character counter 356 and return over line 399 to block 394 to compare the remaining characters in the unresolved buffer 344 with the characters stored in the main buffer 352.

After comparing all the characters, the microprocessor will reach a character position in the buffer 244 where no character is present which will not compare with a character in the buffer 352 (block 396). The microprocessor will then examine each character in the unresolved buffer 344 to see if it is a suspect character (block 401) (FIG. 17D). If the character is a suspect character, the microprocessor will remove the character from the unresolved buffer 344 (block 402)(FIG. 17D). If the character is not a suspect character, the microprocessor will add the character to the main buffer 352 and again check the character data in the main buffer to see if it is sufficient to pass the correlation procedure for establishing the presence of a valid symbol (block 374). If it does, the processor will then check the characters that constitute the valid symbol to determine if there is an overlapping relationship between no more than one of the end characters (block 382). If there is more than one overlapping end character, the microprocessor will check (block 376) to see if there was a fast correlation flag set and if it was, the microprocessor will return over line 380 to block 330 to start a new decoding operation.

It will be seen that the character data comprising a portion of the coded symbol 20 is able to be joined with other portions to form half coded symbols which can be used to form a valid coded symbol. The correlation procedures found in the present decoding system enable the system to provide a high rate of valid read operations of the coded symbols in the shortest possible time.

While the principles of the invention have now been made clear in an illustrative embodiment, it will be obvious to those skilled in the art that many modifications of structure, arrangements, elements and components can be made which are particularly adapted for specific environments and operating requirements without departing from those principles. The appended claims are therefore intended to cover any such modification, within the limits only of the true spirit and scope of the invention.

What is claimed is:

1. A system for decoding a coded symbol having a plurality of consecutively positioned bars and spaces representing characters, wherein each of said characters consists of two bars and two spaces in which the total combined width of said bars and spaces equals seven equal-width modules, the symbol also having a center delimiting character and a margin delimiting character for delimiting numerical characters and for detecting the width of consecutive bars and spaces comprising:

means for scanning the coded symbol in any direction across the coded symbol in which each scan generates data representing a plurality of consecutive bars and spaces of the symbol comprising a minimum of three numerical characters and which includes one of said delimiting characters;

circuit means coupled to said scanning means for applying first predetermined relationships to said data to detect the width of consecutive bars and spaces for generating signals representing four consecutive characters of equal width in response to receiving the data representing each consecutive bar and space whenever the relationships are satisfied;

first means for applying second predetermined relationships to said signals to detect first and second limits, in modules, on the total width of a predetermined number of consecutive bars and spaces and third predetermined relationships to detect the number of modules for each bar-space combination, both the second and third predetermined relationships being applied for detecting valid characters, whose width meets the first and second limits and which contain a number of modules equal to +/− 33% of an integer for each bar-space combination, for detecting invalid characters whose width does not meet said first limit, and for detecting suspect characters whose width meets only the first limit;

memory means for storing and accumulating signals representing valid characters from a plurality of scans;

control means coupled to said memory means for detecting when the memory means is at a predetermined capacity for enabling said second means to retrieve the valid characters from said memory means; and second means for applying fourth predetermined relationships to said accumulated valid characters for assembling the valid characters to represent a coded symbol whenever the first, second, and third predetermined relationships are satisfied, said second means being capable of assembling the characters of a coded symbol even when characters from one scan do not overlap the characters of another scan.

2. The system of claim 1 in which said circuit means includes means for detecting the width of consecutive bars and spaces comprising a character and comparing means for comparing the width of a predetermined number of bars and spaces to determine the occurrence of a character.

3. The system of claim 2 in which said memory means includes first storage means coupled to said first detecting means for storing the signals representing a valid character as determined by said comparing means, counter means for counting the number of valid characters transmitted to said first storage means for outputting a control signal to said first storage means after a predetermined number of valid characters have been stored in said first storage means, and second storage means coupled to said counter means and said second means for storing said control signal enabling said second means to detect when to retrieve said predetermined number of characters from said first storage means.

4. The system of claim 1 in which said circuit means comprises a large scale integrated circuit chip.

5. The system of claim 1 which further includes control means coupled to said first means for controlling said first means to apply one of said second predetermined relationships to said signals.

6. The system of claim 5 in which said control means is further coupled to said second means enabling said second means to store data in said control means for selecting one of said second predetermined relationships which is to be applied by said first means.

7. The system of claim 1 in which said first applying means includes first storage means for storing the valid characters in a predetermined position in said storage means, second storage means for storing the suspect characters in a position corresponding to a position of a valid character in said first storage means and comparing means for comparing the corresponding valid and suspect characters to detect a valid symbol when a predetermined number of valid and suspect characters in each position are equal.

8. The system of claim 7 in which said predetermined number is five.

9. A symbol decoding system for decoding a symbol consisting of a plurality of bars and spaces some of which represent numerical characters separated by a center band delimiting character, in margins and out margins delimiting characters, wherein each of said characters consists of two bars and two spaces in which the total combined width of said bars and spaces equals seven equal-width modules, comprising:

means for scanning the coded symbol in any direction across the symbol in which each scan will generate data representing a plurality of consecutive bars and spaces of the symbol comprising a minimum of three numerical characters and including only one of said delimiting characters;

a large scale integrated circuit chip including circuit means coupled to said generating means for applying first predetermined relationships to said data for generating signals representing four consecutive four consecutive numerical characters of equal width, a center band delimiting character and an in margin or an out margin delimiting character in response to receiving the generated data;

first processing means coupled to said circuit chip for applying second predetermined relationships to said data representing first and second limits on the width of each character and third predetermined relationships to detect the number of modules for each bar-space combination, both the second and third predetermined relationships being applied for detecting valid numerical characters, whose width meets the first and second limits and which contain a number of modules equal to +/−33% of an integer for each bar-space combination, for detecting invalid numerical characters whose width does not meet said first limit, and for detecting suspect characters whose width meets only said first limit, center bands, in margins and out margins;

memory means for storing and accumulating signals representing valid characters from a plurality of scans;

control means coupled to said memory means for detecting when the memory means is at a predetermined capacity for enabling said second means to retrieve the valid characters from said memory means; and second processing means coupled to said first processing means for applying fourth predetermined relationships to the valid and suspect numerical characters, center bands, in margins and out margins to represent a coded symbol whenever the first, second, and third predetermined relationships are satisfied, said second processing means being capable of assembling the characters of a coded symbol even when characters from one scan do not overlap the characters of another scan.

10. The system of claim 9 in which said circuit means includes first counter means coupled to said generating means for detecting the width of consecutive bars and spaces and first comparing means for comparing the width of each of the bars and spaces to determine the presence of a character.

11. The system of claim 10 in which said circuit means further includes second comparing means coupled to said first comparing means for comparing the width of each of the characters with the width of its adjacent characters to determine the presence of a character.

12. The system of claim 11 in which the width of each character is within eighteen percent of each other.

13. The system of claim 11 in which said memory means includes first storage means coupled to said first counter means for storing the data representing a character, and said circuit means further includes logic means coupled to said second comparing means for generating a first control signal when said second comparing means indicates the presence of a character, second counter means for counting the number of characters transmitted to said first storage means for outputting a second control signal to said first storage means for outputting a second control signal to said first storage means after a predetermined number of characters have been stored in said first storage means and second storage means coupled to said counter means and said second processing means for storing said second control signal enabling said second processing means to detect when to retrieve said predetermined number of characters from said first storage means.

14. The system of claim 9 which further includes control means coupled to said first processing means for controlling said first processing means to apply one of said second predetermined relationships to said signals.

15. The system of claim 14 in which said control means is further coupled to said second processing means enabling said second processing means to store data in the control means for selecting which of said second predetermined relationships is to be applied by said first processing means.

16. The system of claim 9 in which said memory means includes a first storage means for storing the valid characters in a predetermined position in said storage means, second storage means for storing the suspect characters in a position corresponding to a position of a valid character in said first storage means and comparing means for comparing the corresponding valid and suspect characters to detect a valid symbol when a predetermined number of valid and suspect characters in each position are equal.

17. The system of claim 16 in which said predetermined number is five.

18. A system for decoding data which consist of a plurality of bars and spaces representing numerical characters and including a center band delimiting character and a margin delimiting character for delimiting the numerical characters in which data is generated comprising a minimum of three numerical characters which includes only one of said delimiting characters, wherein each of said characters consists of two bars and two spaces in which the total combined width of said bars and spaces equals seven equal-width modules, said system comprising:

means for scanning a bar code label in any direction across the label in which each scan will generate said data;

filter means for detecting numerical characters in the data;

first storage means for storing the numerical characters;

first processing means coupled to said first storage means for applying first predetermined relationships representing first and second limits on the width of each character to said numerical characters and second predetermined relationships to detect the number of modules for each bar-space combination, both the second and third predetermined relationships being applied for detecting valid numerical characters, whose width meets said first and second limits and which contain a number of modules equal to $+/-33\%$ of an integer for each bar-space combination, for detecting invalid characters whose width does not meet said first limit, and for detecting suspect numerical characters whose width meets only the first limit, suspect characters whose width meets only said first limit;

second processing means coupled to said first processing means for examining the valid numerical characters and the suspect numerical characters to determine the presence of a first type of data configuration which includes said predetermined minimum number of numerical characters and both of the delimiting characters and the presence of a second type of data configuration which includes said minimum predetermined number of numerical characters and one delimiting character;

second storage means for storing and accumulating the first type of data configuration;

third storage means for storing and accumulating the second type of data configuration; and means for retrieving and comparing the numerical characters occupying common positions in each of the second type of data configurations with the first type of data configurations and merging the characters of said first and second data configuration when the numerical characters occupying the same positions have a predetermined number of the same numerical values to form a single data configuration having both delimiting characters and a single set of numerical characters, said second processing means forming a complete label from said single data configuration when the parity of such configurations have indicated that the configurations represent different portions of the same label, said retrieving and comparing means being capable of assembling the characters of a coded symbol even when characters from one scan do not overlap the characters of another scan.

19. The system of claim 18 in which the predetermined number is five.

20. The system of claim 18 in which said first limit is 1.5-5.5 modules for each adjacent bar-space combination.

* * * * *

UNITED STATES PATENT AND TRADEMARK OFFICE
CERTIFICATE OF CORRECTION

PATENT NO. : 5,194,722
DATED : March 16, 1993
INVENTOR(S) : Barry M. Mergenthaler et al.

It is certified that error appears in the above-identified patent and that said Letters Patent is hereby corrected as shown below:

Column 18, line 50, delete "four consecutive" .

Signed and Sealed this

Twenty-second Day of February, 1994

Attest:

BRUCE LEHMAN

Attesting Officer          Commissioner of Patents and Trademarks